United States Patent [19]
Fukushima et al.

[11] Patent Number: 5,282,059
[45] Date of Patent: Jan. 25, 1994

[54] FACSIMILE APPARATUS COMPRISING CONVERTING MEANS FOR CONVERTING BINARY IMAGE DATA INTO MULTI-VALUE IMAGE DATA

[75] Inventors: Shigenobu Fukushima, Yokohama; Masamichi Sugiura, Toyokawa; Munehiro Nakatani, Toyohashi, all of Japan

[73] Assignee: Minolta Camera Kabushiki Kaisha, Osaka, Japan

[21] Appl. No.: 951,721

[22] Filed: Sep. 25, 1992

[30] Foreign Application Priority Data

Sep. 27, 1991 [JP] Japan .................................. 3-249048

[51] Int. Cl.⁵ .......................... H04N 1/00; H04N 1/40
[52] U.S. Cl. .................................................... 358/456
[58] Field of Search .................. 358/426, 261.1-261.4, 358/427, 456, 458; 382/56

[56] References Cited

U.S. PATENT DOCUMENTS

| | | | |
|---|---|---|---|
| 4,571,634 | 2/1986 | Caneschi et al. | 358/261 |
| 5,008,949 | 4/1991 | Arimoto | 382/41 |
| 5,130,809 | 7/1992 | Takayanagi | 358/300 |
| 5,220,649 | 6/1993 | Forcier | 395/148 |

FOREIGN PATENT DOCUMENTS

| | | |
|---|---|---|
| 58-75372 | 5/1983 | Japan . |
| 62-107573 | 5/1987 | Japan . |
| 62-114377 | 5/1987 | Japan . |
| 62-114378 | 5/1987 | Japan . |
| 63-11832 | 3/1988 | Japan . |
| 2-165775 | 6/1990 | Japan . |
| 3-157060 | 7/1991 | Japan . |
| 2170373 | 7/1986 | United Kingdom . |

OTHER PUBLICATIONS

Publication entitled "Higher fine multi-value recovery of binary image by Neural Network" by Yoshinobu Mita, et al., Japan Hard Copy '90, NIP-24, pp. 233–236, 1990.

Primary Examiner—Stephen Brinich
Attorney, Agent, or Firm—Willian Brinks Olds Hofer Gilson & Lione

[57] ABSTRACT

In a facsimile apparatus, image data receiver receives compressed image data transmitted from a transmission apparatus apart from the facsimile apparatus. A first expanding section expands the received image data using a first expanding method, and a second expanding section expands the received image data using a different second expanding method. A data converter converts white and black binary image data into multi-value image data in multi-gradation stages representation, and a judging section judges whether the received image data are binary image data or multi-value image data. Further, a controller controls the first expanding section and a printer to expand the compressed image data judged as multi-value image data and thereafter print in multi-gradation stages an image corresponding to the expanded image data, and also controls the second expanding section, the data converter and the printer to expand the compressed image data judged as binary image data, convert the expanded image data into multi-value image data, and thereafter print in multi-gradation stages an image corresponding to the converted multi-value image data.

31 Claims, 16 Drawing Sheets

| −1 | 0 | 0 | 0 | −1 |
|---|---|---|---|---|
| 0 | 0 | 0 | 0 | 0 |
| 0 | 0 | 4 | 0 | 0 |
| 0 | 0 | 0 | 0 | 0 |
| −1 | 0 | 0 | 0 | −1 |

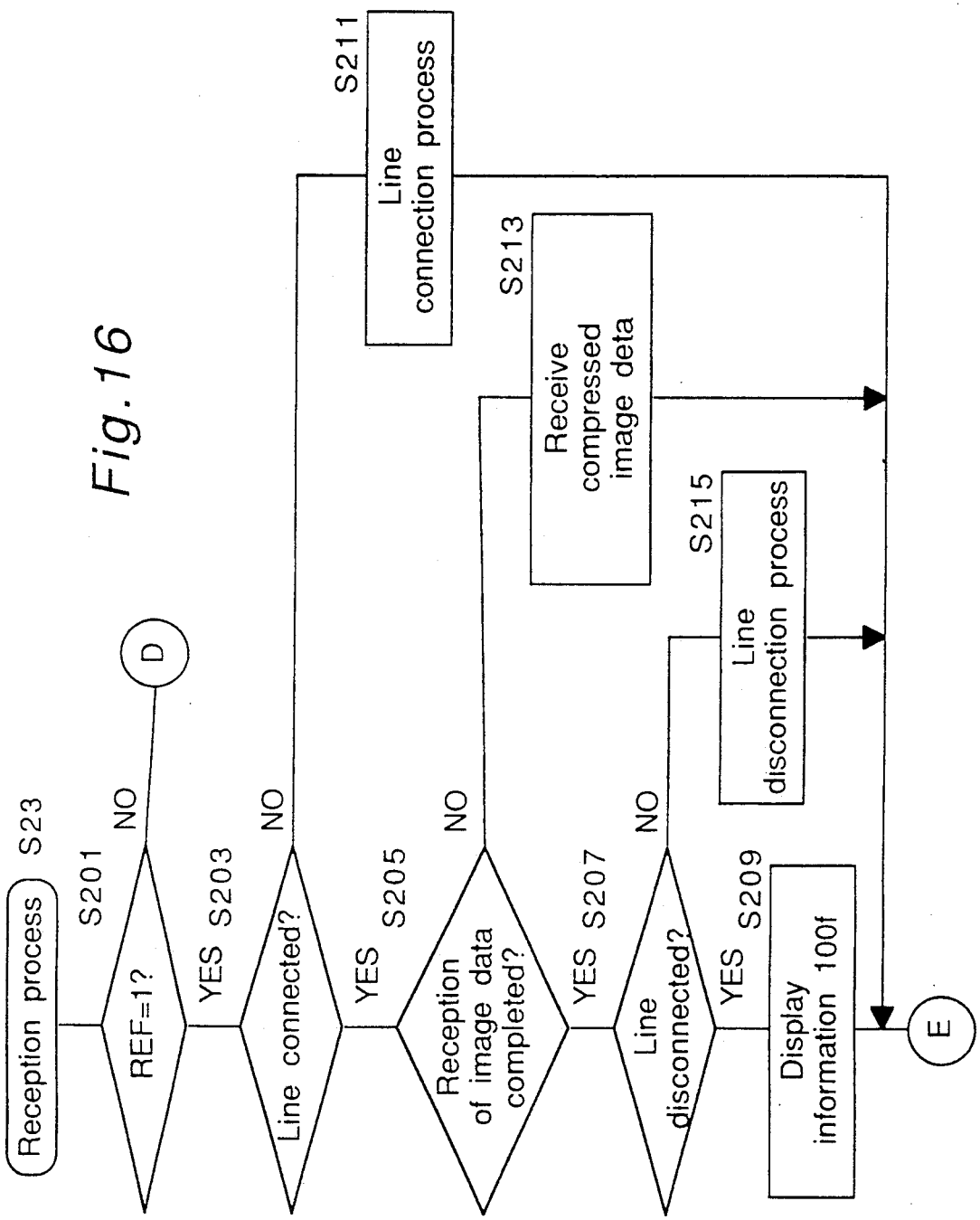

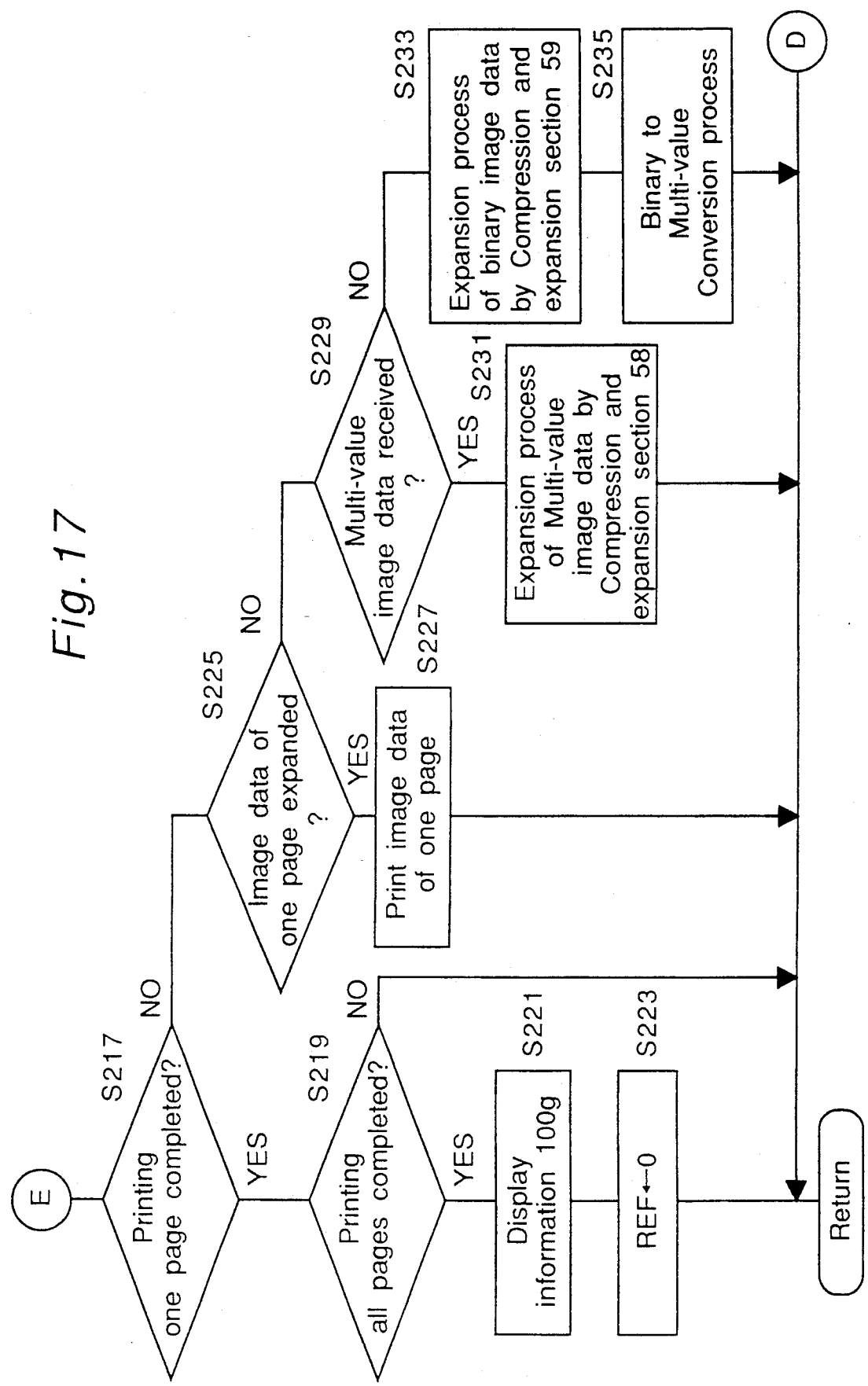

FACSIMILE APPARATUS COMPRISING CONVERTING MEANS FOR CONVERTING BINARY IMAGE DATA INTO MULTI-VALUE IMAGE DATA

BACKGROUND OF THE INVENTION

1. Field of the Invention

The present invention relates to a facsimile apparatus, and more particularly, to a facsimile apparatus comprising an image recovery circuit for recovering pseudo half-tone binary image data into image data of multi-gradation stages including an image density of half-tone (referred to as a multi-value image data hereinafter).

2. Description of the Related Art

In a conventional facsimile apparatus, for the purpose of transmitting an image signal through a public telephone line, a half-tone image such as a photograph image or the like is converted into pseudo half-tone binary image data by binarizing the half-tone multi-value image data by a dither method or the like at the transmitting terminal, while at the receiving terminal the received pseudo half-tone binary image data are recovered into multi-value image data.

A method and an apparatus of this type are disclosed, respectively, in Japanese Patent Application Laid-Open Publications Nos. 62-114378 and 62-107573.

The former first conventional image processing method has such a feature that a multi-value printer is used even for processing conventional type binary image data to sufficiently draw the capability of the apparatus, and to improve the quality of character images to be recovered, a half-tone image is recovered from the binary image data and then the recorded binary image data are subject to a prescribed image process such as an image expansion process, an image reduction process, an image emphasis process or the like. According to the first conventional method, in order to convert the binary image data into the multi-value image data by a recovering process, a square window having specified dimensions has been set up around a pixel to be recovered or processed (referred to as "a specified pixel" hereinafter) to perform a smoothing process within the square window.

Further, the latter second conventional image processing apparatus has the following features. In order to prevent possible image deterioration from occurring when a simple binary circuit for effecting the process using the dither method or the like and also to allow the apparatus to be made up of simple circuits, the second image processing apparatus is provided with means for dividing binary image data into prescribed block areas, discrimination means for discriminating a kind of image tone of each of the divided block areas, and conversion means for converting the image data of each of the block areas into image data having multi-value levels every pixel according to the discrimination result of the discrimination means. In the above-mentioned second image processing apparatus, binary image data are handled upon transmitting and storing image data to increase the efficiency in editing the image of the image data displayed on a display, while the image is expressed in a form of multi-value image similar to an analog image upon reproducing the image. The above-mentioned discrimination means and the conversion means are in practical composed of an image tone judgment ROM for judging image tone using a pattern matching method within a block area corresponding to a dither matrix size and a conversion ROM, respectively.

By performing the above-mentioned recovery of binary image data into multi-value image data, the received image can be printed out as a multi-value image. However, since the image data are once converted into binary image data in the course of data transmission, the resulting image cannot be prevented from deteriorating in fidelity and resolution with respect to the original.

In the above regard, any conventional facsimile apparatus transmits a non-half-tone image such as a character image in the form of binary image data, and further transmits a half-tone image such as a photograph image in the form of pseudo half-tone binary image data. Therefore, the conventional facsimile apparatus does not transmit multi-value image data, which means that there has been no facsimile apparatus capable of managing multi-value image data as received image data.

In view of the above, it can be considered to transmit image data in the form of compressed multi-value image data, and data compression and expansion method (referred to as "a third conventional method" hereinafter) for transmitting multi-value image data of a color still image through a communication line is disclosed, for example, in Saito, et al. "Lecture on Image Data Compression of Still Image Coding System", Television Academy Journal, Vol. 44, No. 2, February, 1990 According to the above-mentioned third conventional method, a data compression and expansion process is performed by the ADCT (Adaptive Discrete Cosine Transform) coding method.

Therefore, it is expected that the above-mentioned type of facsimile apparatus for transmitting image data in the form of multi-value image data will be popularized in future. However, since facsimile apparatuses which transmit image data in the form of binary image data are widely used currently, such a future facsimile is also required to cope with binary image data transmitted from the current facsimiles to avoid practical inconvenience.

SUMMARY OF THE INVENTION

An object of the present invention is therefore to provide a facsimile apparatus capable of managing not only binary image data but also multi-value image data as received image data.

Another object of the present invention is to provide a facsimile apparatus capable of outputting received image data in a form of multi-value image data to record the image corresponding thereto even though the received image data are binary image data or multi-value image data.

In order to achieve the aforementioned objective, according to one aspect of the present invention, there is provided a facsimile apparatus comprising:

image data receiving means for receiving compressed image data transmitted from a transmission apparatus apart from said facsimile apparatus;

first expanding means for expanding said compressed image data received by said image data receiving means using a first expanding method;

second expanding means for expanding said compressed image data received by said image data receiving means using a second expanding method different from said first expanding method;

converting means for converting binary image data representing an image density of each pixel in binary representation of black pixel or white pixel, into multi-value image data representing an image density of each pixel in multi-gradation stages representation including half-tone density;

printing means for printing an image corresponding to multi-value image data in multi-gradation stages;

judging means for judging whether said image data received by said image data receiving means are binary image data or multi-value image data; and controlling means for controlling said first expanding means and said printing means to expand said compressed image data judged as multi-value image data by said judging means and thereafter print an image corresponding to said expanded image data, and for controlling said second expanding means, said converting means and said printing means to expand said compressed image data judged as binary image data by said judging means, convert said expanded image data into multi-value image data, and thereafter print an image corresponding to said converted multi-value image data.

According to another aspect of the present invention, there is provided a facsimile apparatus comprising:

image data receiving means for receiving compressed image data transmitted from a transmission apparatus apart from said facsimile apparatus;

first storage means for storing therein said compressed image data received by said image data receiving means;

judging means for judging whether said image data received by said image data receiving means are binary image data representing an image density of each pixel in binary representation of black pixel or white pixel or multi-value image data representing an image density of each pixel in multi-gradation stages representation including half-tone density;

first expanding means for reading out said compressed image data stored in said first storage means and expanding said read compressed image data using a first expanding method when said judging means judges that said image data received by said image data receiving means are binary image data;

second expanding means for reading out said compressed image data stored in said first storage means and expanding said read compressed image data using a second expanding method different from said first expanding method when said judging means judges that said image data received by said image data receiving means are multi-value image data;

converting means for converting said binary image data expanded by said first expanding means into multi-value image data; and printing means for printing in multi-gradation stages an image corresponding to said multi-value image data converted by said converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

According to a further aspect of the present invention, there is provided a facsimile apparatus comprising:

image reading means for reading a document image and converting said read document image into multi-value image data representing an image density of each pixel in multi-gradation stages representation including half-tone density;

determining means for determining whether said multi-value image data converted by said image reading means are to be transmitted in a form of multi-value image data or are to be transmitted in another form of binary image data representing an image density of each pixel in binary representation of black pixel or white pixel;

first converting means for converting said multi-value image data converted by said image reading means into binary image data when said determining means determines that said multi-value image data converted by said image reading means are to be transmitted in the form of binary image data;

first compressing means for compressing said binary image data converted by said first converting means using a first compressing method;

second compressing means for compressing said multi-value image data converted by said image reading means using a second compressing method different from said first compressing method;

image data transmitting means for transmitting to a further facsimile apparatus apart from said facsimile apparatus said image data compressed by said first compressing means when said determining means determines that said multi-value image data converted by said image reading means are to be transmitted in the form of binary image data, and for transmitting to said further facsimile apparatus said image data compressed by said second compressing means when said determining means determines that said multi-value image data converted by said image reading means are to be transmitted in the form of multi-value image data;

image data receiving means for receiving compressed image data transmitted from said further facsimile apparatus;

judging means for judging whether said image data received by said image data receiving means are binary image data or multi-value image data;

first expanding means for expanding said compressed image data received by said image data receiving means using a first expanding method when said judging means judges that said image data received by said image data receiving means are binary image data;

second expanding means for expanding said compressed image data received by said image data receiving means using a second expanding method different from said first expanding method when said judging means judges that said image data received by said image data receiving means are multi-value image data;

second converting means for converting said binary image data expanded by said first expanding means into multi-value image data; and printing means for printing in multi-gradation stages an image corresponding to said multi-value image data converted by said second converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 16 and 17 are flow charts of a reception process of a subroutine shown in FIG. 10.

DETAILED DESCRIPTION OF THE PREFERRED EMBODIMENTS

Figure 3:
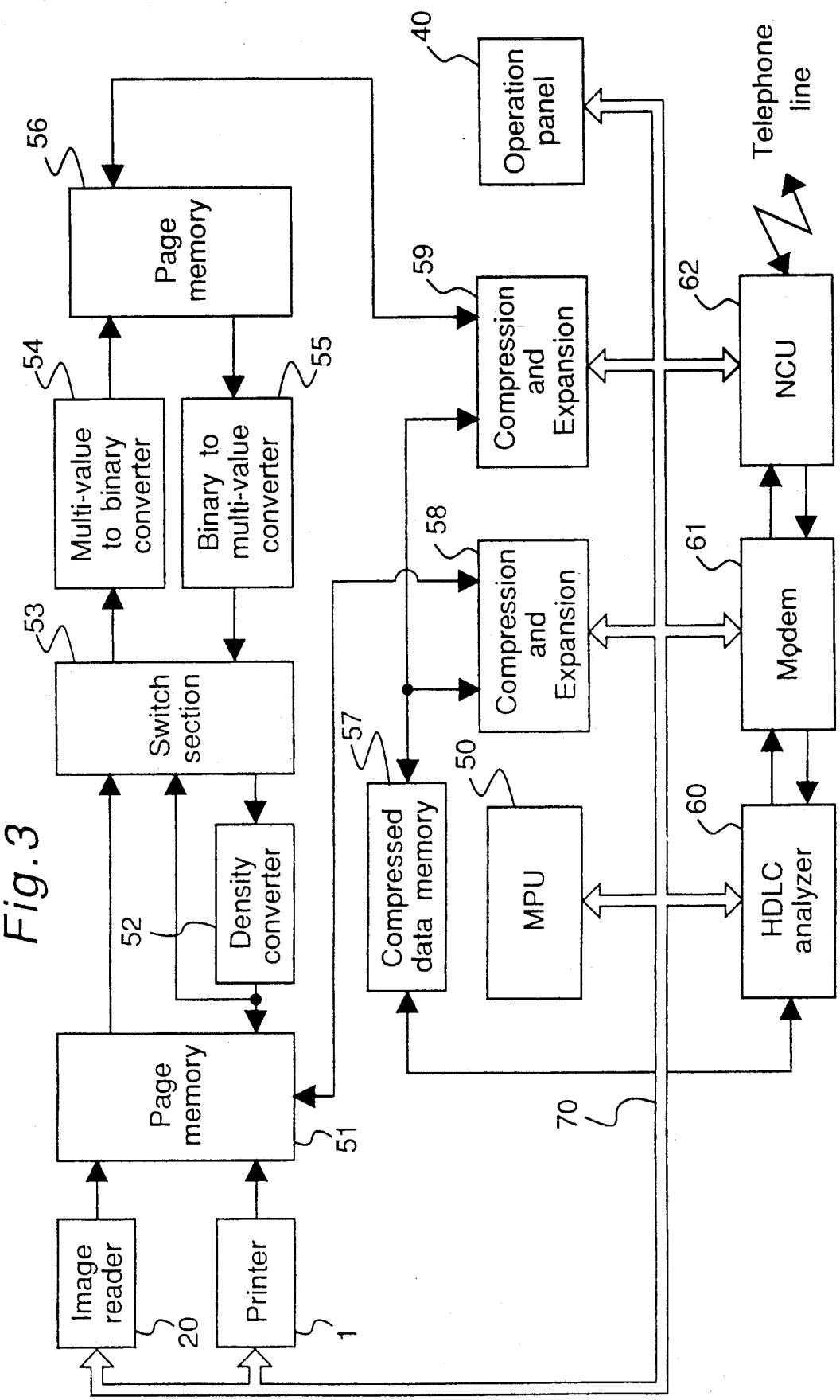
FIG. 3 is a schematic block diagram showing a signal processing section of the facsimile apparatus shown in FIG. 1.

The following describes a facsimile apparatus in accordance with a preferred embodiment of the present invention with reference to the attached drawings. The facsimile apparatus of the present preferred embodiment has such features that it includes, as shown in FIG. 3, a compression and expansion section 58 for effecting prescribed data compression and expansion on multi-value image data, and a binary to multi-value converter 55 for recovering binary image data which has been expanded after reception into multi-value image data corresponding to the original image data.

In the description hereinafter, the term of "half-tone image" means a pseudo half-tone image obtained by binarizing, for example, multi-value image data of a half-tone image such as a photograph using a dither method, and the term of "half-tone area" means the area of the half-tone image. Meanwhile, the term of "non-half-tone image" means a non-half-tone image such as a character image, and the term of "non-half-tone area" means the area of the non-half-tone image. Images having a medium tone between the "half-tone image" and the "non-half-tone image" may include an image obtained by binarizing a character image and an artificially formed image such as a character font, and each of these images is treated as a "non-half-tone image" in the present preferred embodiment. An image obtained by simply binarizing a photograph image by means of a prescribed threshold value is out of consideration in the present preferred embodiment because almost all image information disappear in this case.

In general, image data binarizing methods can be classified as follows. Image data binarizing methods can be largely classified into a simple binarizing method of binarizing image data by means of a prescribed threshold value, and a pseudo half-tone binarizing method of binarizing image data using the pseudo half-tone method. The pseudo half-tone binarizing method can be classified into a random dither method (or error diffusion method) and an ordered dither method. The ordered dither method can be classified into a dot dispersion type dither method, and a dot concentration type dither method or Fattening type dither method. It is now defined that binary images binarized in pseudo half-tone by the random dither method and the ordered dither method are respectively referred to as a random half-tone image and an ordered half-tone image, and binary images binarized in pseudo half-tone by the dot concentration type or a Fattening type ordered dither method are referred to as the Fattening type half-tone image. Since the random dither method is substantially a dot dispersion type binarizing method, the other pseudo half-tone images can be referred to as a dispersion type half-tone image.

It is to be noted that binary image data represents an image density of each pixel in binary representation of black pixel or white pixel in the present preferred embodiment.

The following describes a facsimile apparatus in accordance with the present preferred embodiment of the present invention with regard to the following items in the order as below.

(1) Construction of Facsimile apparatus
(2) Multi-value to binary converter
(3) Binary to multi-value converter
(4) Compression and expansion section
(5) MPU processing flow
(6) Other preferred embodiments

(1) Construction of Facsimile apparatus

Figure 1:
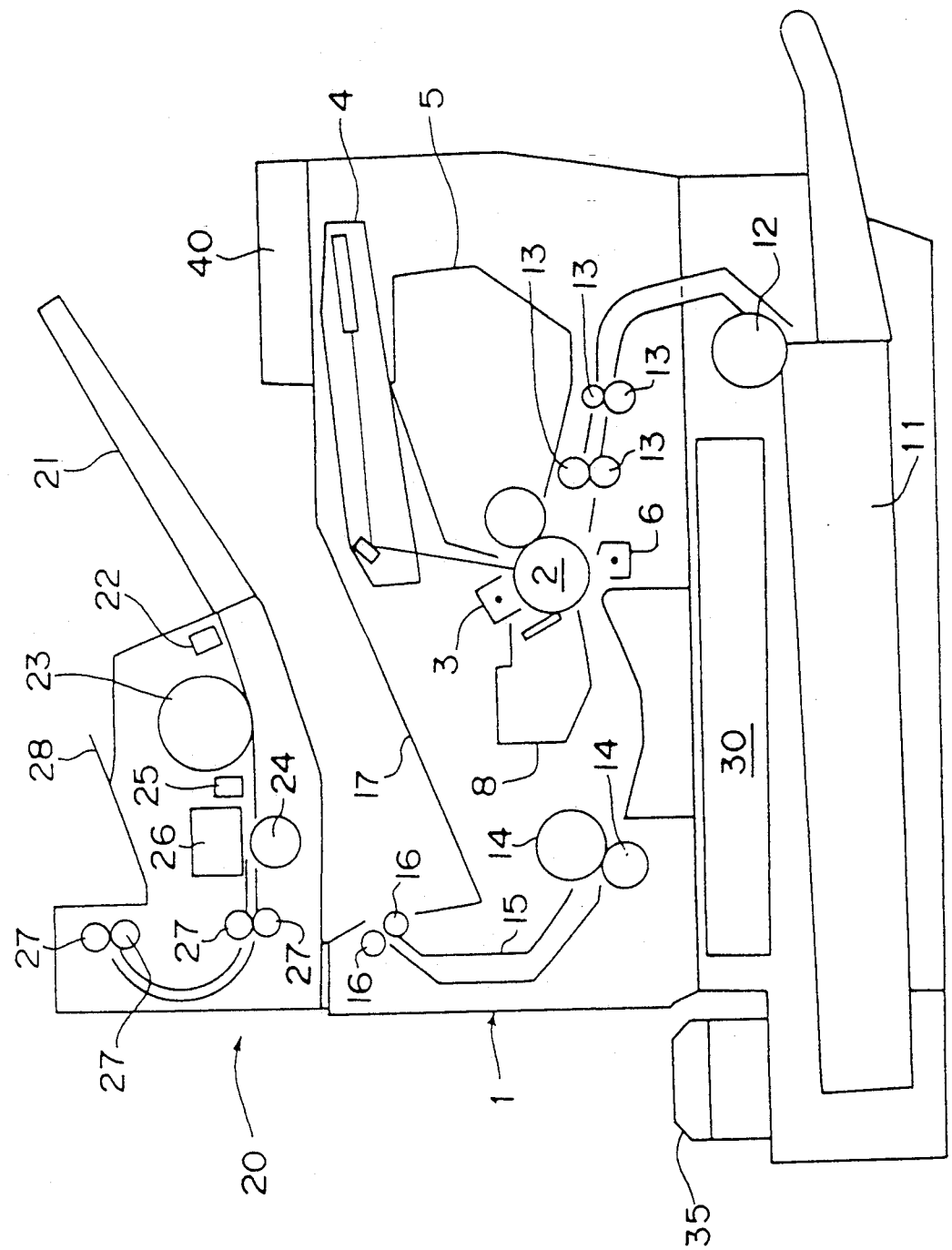
FIG. 1 is a schematic longitudinal cross sectional view showing a mechanical section of a facsimile apparatus of a preferred embodiment according to the present invention.

FIG. 1 shows a cross section of a mechanical section of a facsimile apparatus in accordance with the present preferred embodiment of the present invention, while FIG. 3 shows a signal processing section of the facsimile apparatus shown in FIG. 1.

Referring to FIG. 1, the present facsimile apparatus of the present preferred embodiment is mainly separated into a printer 1 and an image reader 20 mounted on the printer 1, wherein an operation panel 40 is provided on the printer 1, and a telephone set 35 is provided on a side of the printer 1.

Referring to FIG. 1, there is provided the printer 1 of an electrophotographic laser printer which has a structure similar to a conventional facsimile apparatus and records multi-value image data in multi-gradation stages on a piece of cut paper, and therefore, the operation of the apparatus will be described simply as follows.

First of all, a photoconductive layer on a photoconductive drum 2 which is driven to be rotated is uniformly electrified by a corona charger 3. Then a beam of laser light is applied to the photoconductive drum 2 by an optical system 4 according to image data so as to form an electrostatic latent image on the photoconductive drum 2. The electrostatic latent image formed on the drum 2 is developed with toner by a developing unit 5 so as to form a toner image corresponding to a document image on the photoconductive drum 2. On the other hand, a number of cut papers placed in a paper feeding cassette 11 are picked up one by one by a pick-up roller 12 and then are fed to a transfer portion of the photoconductive drum 2 by a pick-up roller 13. The toner image formed on the photoconductive drum 2 is transferred onto a piece of cut paper by a transfer charger 6, and then, the formed toner image is fixed by a fixing unit 14. After the toner fixing operation, the paper is discharged to a paper discharging tray 17 via a paper discharging path 15 by paper discharging rollers 16. It is noted that the toner which was not transferred to the cut paper is collected by a cleaner 8 to complete one printing operation.

An operation of the image reader 20 will be described below. A document image to be transmitted is read in a manner similar to that of the conventional apparatus. In detail, a number of original documents placed on a document tray 21 are detected by a document sensor 22, and then, are fed to a position under a paper sensor 25 by a roller 23 one by one. In synchronous with rotation of a roller 24 by a motor (not shown) and a reading operation of a contact type linear image sensor 26, each of the document images is read by the contact type linear image sensor 26. The document image is converted into a digital image data, and then, the converted digital image data are outputted to a page memory 51 shown in FIG. 3 to be subject to image process as described in detail hereinafter in a signal processing section shown in FIG. 3. After completion of the image reading operation, the document is discharged to a document discharging tray 28 by a paper discharging roller 27.

Figure 2:
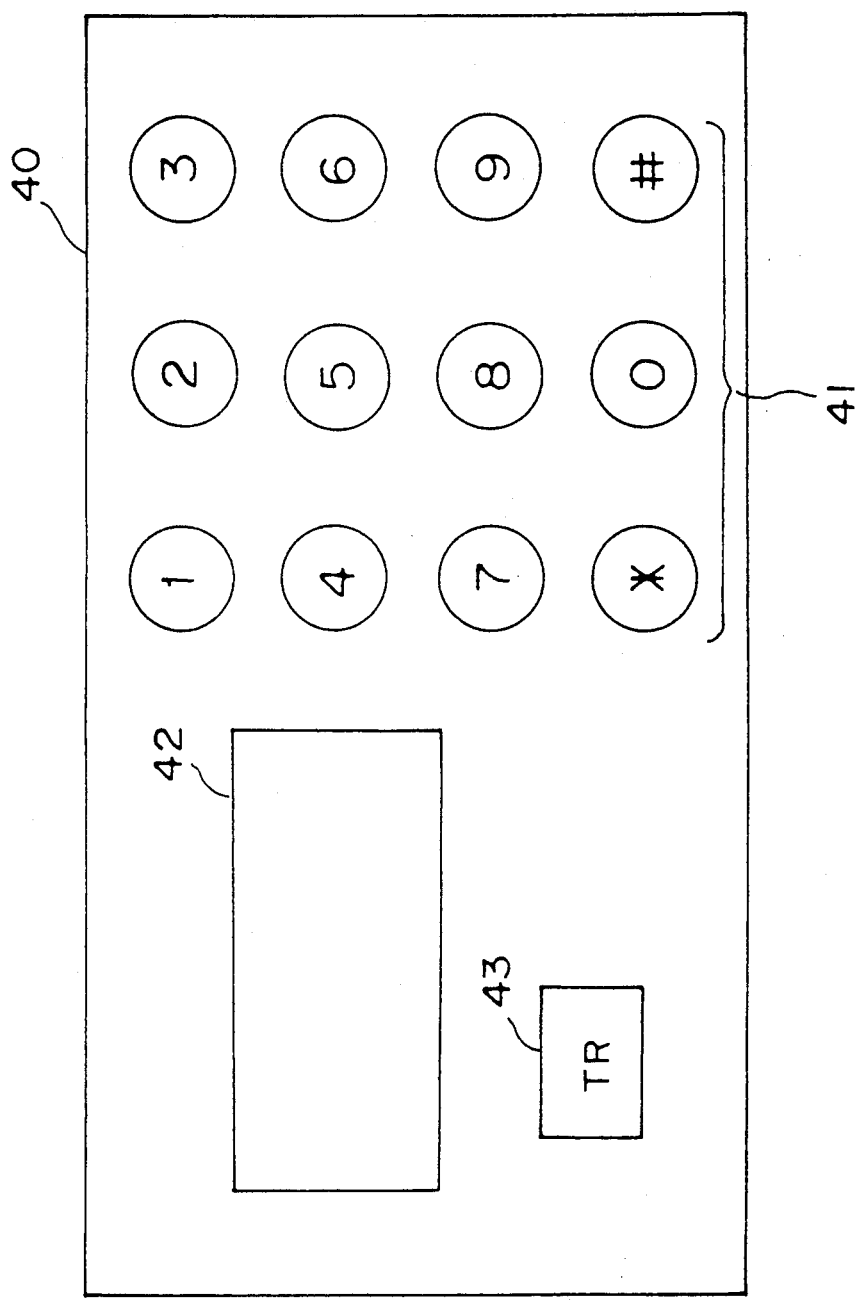
FIG. 2 is a schematic front view showing an operation panel 40 of the facsimile apparatus shown in FIG. 1.

FIG. 2 shows an operation panel 40 of the facsimile apparatus of the present preferred embodiment.

Referring to FIG. 2, the operation panel 40 comprises numeral keys "0" through "9", an asterisk key "*", and a sharp key "⌗" while being provided with a set of telephone ten keys 41 for inputting a facsimile number of the other party, a liquid crystal display section 42 for displaying operation conditions of the present facsimile apparatus and information of a variety of matters for the operator (See display information items 100a through 100g shown in FIGS. 18a to 18g), and a transmission key 43 for designating start of data transmission of the present facsimile apparatus.

Referring to FIG. 3, the signal processing section of the present facsimile apparatus comprises a micro processing unit (referred to as an MPU hereinafter) 50 of a controller for controlling operation of the entire facsimile apparatus, the aforementioned operation panel 40, an HDLC analyzer 60 for effecting a prescribed process and a recovering process on image data based on the HDLC standard, a modulator and demodulator (referred to as a MODEM hereinafter) 61 for modulating and demodulating image data and control signals, a network control unit (referred to as an NCU hereinafter) 62 which is connected to a telephone line and includes a dialer to control communication with a network of the telephone line, the aforementioned data compression and expansion section 58 for compressing and expanding multi-value image data, and a data compression and expansion section 59 for compressing and expanding binary image data. The operation panel 40, the processing sections 58, 59, 60, 61 and 62, the image sensor 26 of the image reader 20, and a printer controller of the printer 1 are connected via a bus 70 to the MPU 50.

In the signal processing section of the present facsimile apparatus, there are provided:

(a) the page memory 51 which is connected to the image sensor 26 of the image reader 20, the printer 1, a density converter 52, a switch section 53, and the data compression and expansion section 58, and which stores in a developed form multi-value image data of one page which is read and converted by the image sensor 26 or to be recorded in the printer 1;

(b) the density converter 52 which is connected to the page memory 51 and the switch section 53, and which automatically reduces a size of the image of the image data based on the recording size of the further facsimile apparatus of the other party;

(c) the switch section 53 which is connected to the page memory 51, the density converter 52, a multi-value to binary converter 54, the binary to multi-value converter 55, and which switches flows of image data among the processing sections 51, 52, 54 and 55;

(d) the multi-value to binary converter 54 which effects multi-value to binary conversion on multi-value image data outputted from the switch section 53 and thereafter outputs the resulting binary image data to a page memory 56;

(e) the binary to multi-value converter 55 which effects binary to multi-value conversion on binary image data outputted from the page memory 56 and thereafter outputs the resulting multi-value image data to the switch section 53; and (f) the page memory 56 which is connected to the multi-value to binary converter 54, the binary to multi-value converter 55, and the data compression and expansion section 59 and which stores in a developed form inputted binary image data of one page.

Furthermore, the signal processing section comprises a compressed data memory 57 which is connected to the HDLC analyzer 60, the data compression and expansion sections 58 and 59, and which temporarily stores multi-value image data compressed by the data compression and expansion section 58 as well as binary image data compressed by the data compression and expansion section 59. It is noted that the processing operation of the signal processing section controlled by the MPU 50 is described in detail later with reference to control flow charts.

(2) Multi-value to binary converter

Figure 4:
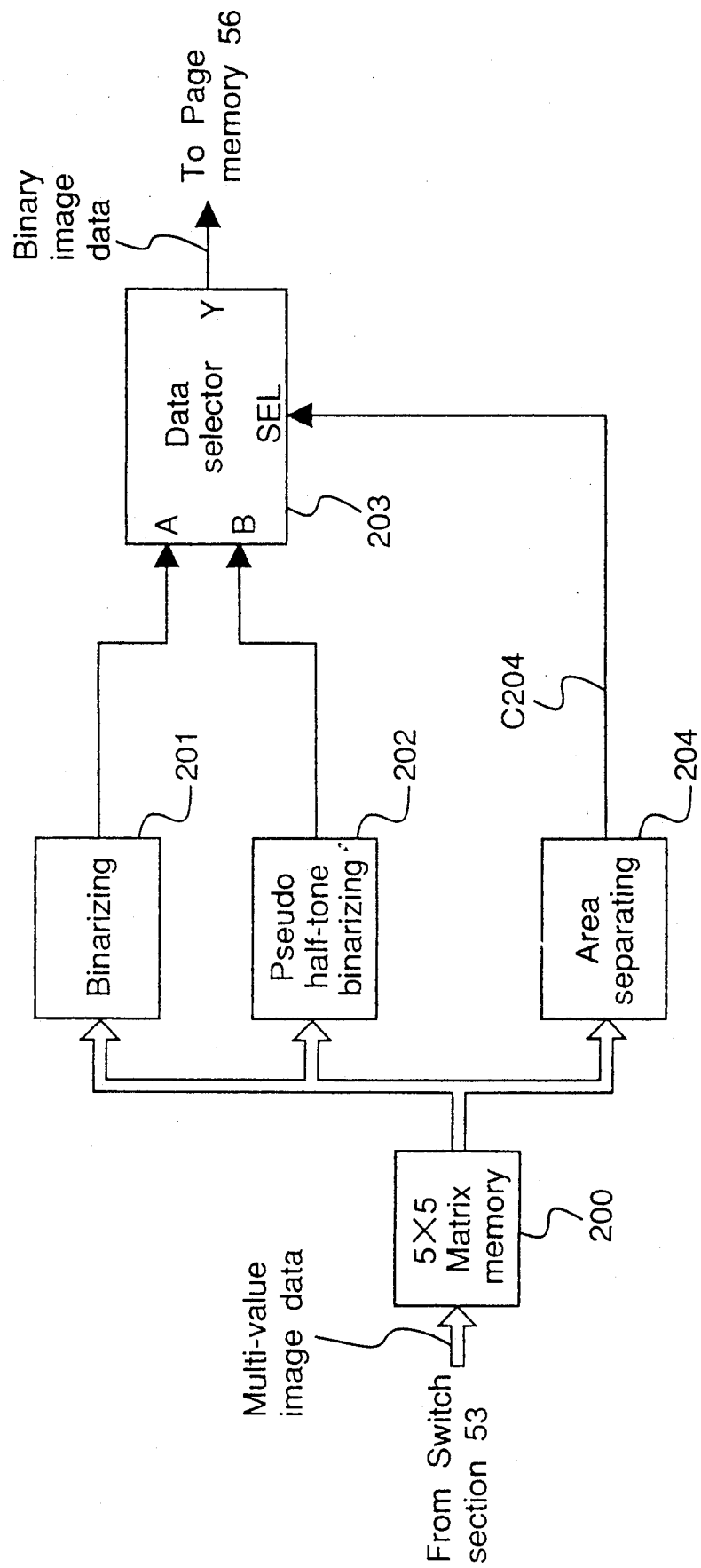
FIG. 4 is a schematic block diagram showing a multi-value to binary converter 54 shown in FIG. 3.

FIG. 4 shows the multi-value to binary converter 54 shown in FIG. 3.

Referring to FIG. 4, multi-value image data outputted from the switch section 53 are inputted to a 5×5 matrix memory circuit 200. The 5×5 matrix memory circuit 200 is a known circuit composed of four FIFO memories and twenty shift registers. The 5×5 matrix memory circuit 200 temporarily stores multi-value image data inputted serially every pixel and simultaneously outputs multi-value image data of respective pixels located in a 5×5 pixel window having a specified pixel in the center thereof to a binarizing section 201, a pseudo half-tone binarizing section 202 and an area separating section 204, distributively. In the present preferred embodiment, the 5×5 pixel window means a window in a matrix form of 5×5 pixels, wherein the specified pixel is located in the center of the 5×5 pixel window, and the other peripheral pixels are located around the specified pixel.

The binarizing section 201 effects a simple binarizing process on the inputted multi-value image data by the non-half-tone binarizing method using a prescribed threshold level, and then, outputs the resulting data to an input terminal A of a data selector 203. Meanwhile, the pseudo half-tone binarizing section 202 effects a binarizing process on the inputted multi-value image data in pseudo half-tone according to a prescribed pseudo half-tone binarizing method, and then, outputs the resulting data to an input terminal B of the data selector 203.

Figures 5, 6:
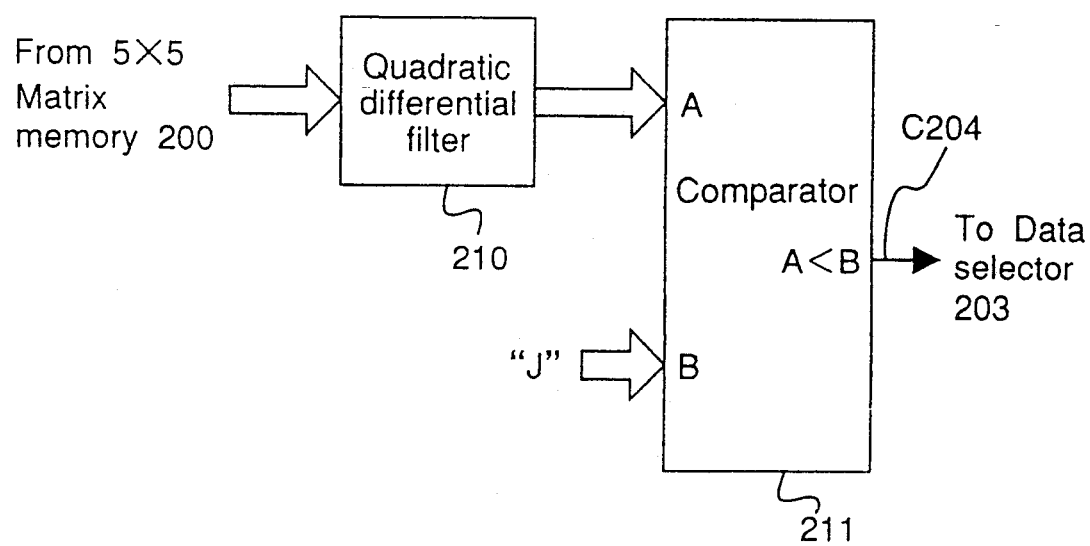
FIG. 5 is a front view showing a Laplacian quadratic differential filter used in an area separating section 204 shown in FIGS. 4 and 6.
FIG. 6 is a schematic block diagram showing the area separating section 204 shown in FIG. 4.

Referring to FIG. 6, the area separating section 204 comprises a Laplacian quadratic differential filter 210 composed of a spatial filter of a 5×5 pixel window shown in FIG. 5 and a comparator 211. The quadratic differential filter 210 effects a quadratic differential process with the spatial filter shown in FIG. 5 on the inputted multi-value image data, and then, outputs the resulting data to an input terminal A of the comparator 211. To the input terminal B of the comparator 211 is inputted prescribed threshold value data J for discriminating whether the inputted image data are half-tone image data or a non-half-tone image data. When $A \geq B$, the comparator 211 makes such a judgment that the inputted multi-value image data are non-half-tone image data, and consequently outputs a low-level discrimination signal C204 representing the judgment result thereof to a selection signal input terminal SEL of the data selector 203. When $A < B$, the comparator 211 makes such a judgment that the inputted multi-value image data are half-tone image data, and consequently outputs a high-level discrimination signal C204 representing the judgment result thereof in the same manner as above.

When the low-level discrimination signal is inputted to the data selector 203, the data selector 203 selects the binary image data outputted from the binarizing section 201, and then, outputs the selected image data to the page memory 56. When the high-level discrimination signal is inputted to the data selector 203, the data selector 203 selects the binary image data outputted from the pseudo half-tone binarizing section 202, and then, outputs the selected image data to the page memory 56.

(3) Binary to multi-value converter

Figure 7:
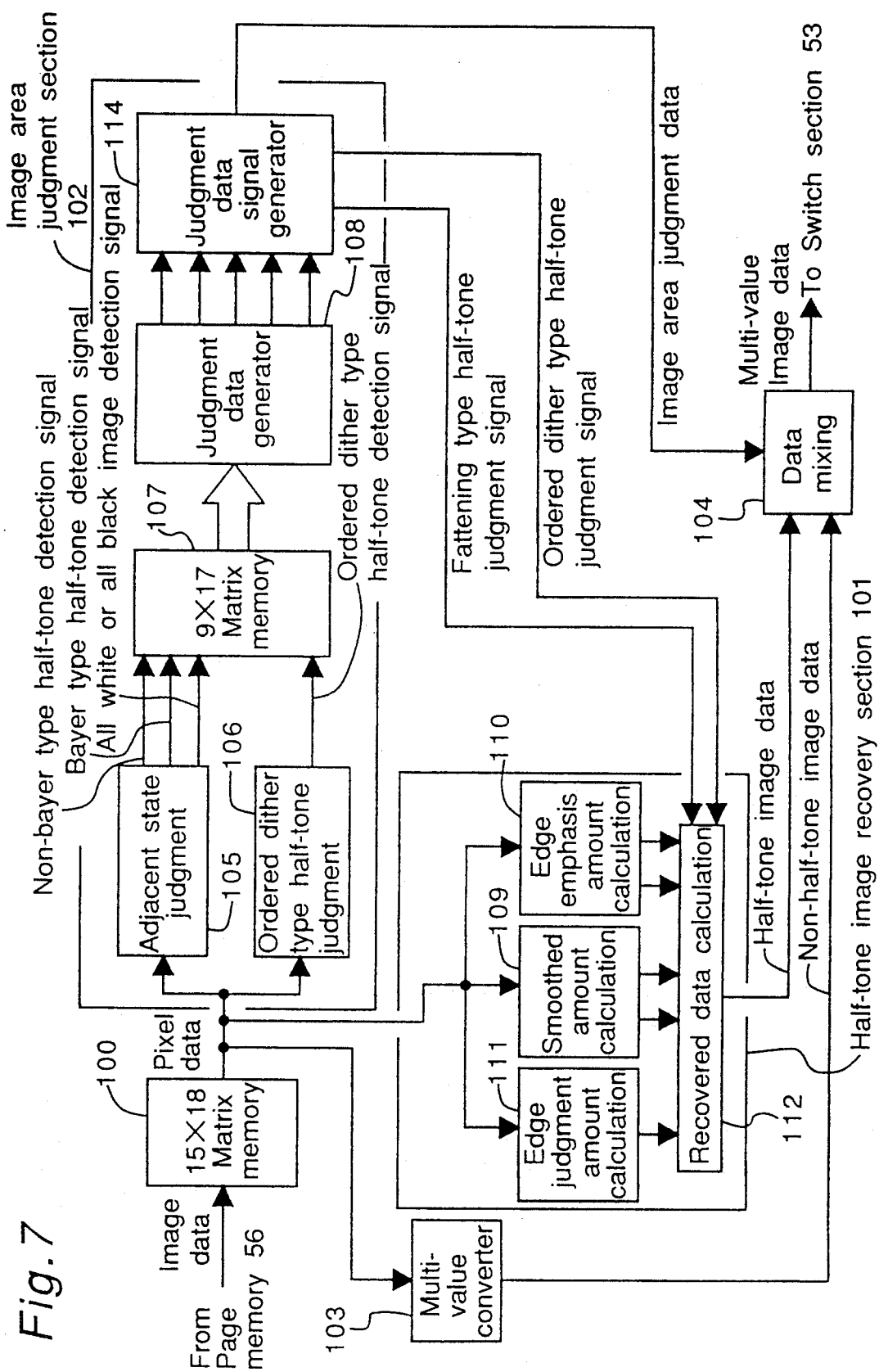
FIG. 7 is a schematic block diagram showing a binary to multi-value converter 55 shown in FIG. 3.

FIG. 7 shows the binary to multi-value converter 55 shown in FIG. 3.

Referring to FIG. 7, the binary to multi-value converter 55 comprises a half-tone image recovery section 101 for recovering multi-value half-tone image data from the received binary image data. The half-tone image recovery process yields the following effect. Half-tone image data such as photograph image data are generally expressed in a form of multi-value image data of plural bits per pixel. However, as known to those skilled in the art, by binarizing the multi-value image data into binary image data using the pseudo half-tone binarizing method when communicating image data through such apparatus as a facsimile or storing image data in such case as filing them, the amount of data to be communicated or stored can be remarkably reduced.

The half-tone image recovery process is effective, for example, in the case where half-tone image data binarized using the pseudo half-tone binarizing method are recorded or displayed in binary representation with pixel densities different from each other. In other words, by firstly subjecting the pseudo half-tone binary image to a recovery process into multi-value image data and then subjecting to a magnification conversion instead of only a magnification conversion, Moire caused due to the periodicity of the original pseudo half-tone binary image data can be prevented. The recovered multi-value image data are binarized using the pseudo half-tone binarizing method, and then, the binarized image data are outputted to an output system such as a CRT display or a printer. In the above-mentioned case, the use of the performance of the output system can be fully made when the output system is capable of processing inputted data in high density or high resolution. Furthermore, the half-tone image recovery process is effective when binary image data binarized using the pseudo half-tone method are recovered into multi-value image data, the recovered multi-value image data being outputted to an output system such as a multi-gradation CRT display or a multi-gradation printer.

As shown in FIG. 7, binary image data read out serially from the page memory 56 are inputted to a 15×18 matrix memory circuit 100. The 15×18 matrix memory circuit 100 is a known circuit which is composed of 14 FIFO memories and 15×17 shift registers. The 15×18 matrix memory circuit 100 simultaneously generates data of pixels distributed in a matrix of the 15×18 pixel window based on the inputted binary image, and outputs the pixel data to (a) a group of a smoothed amount calculation section 109, an edge emphasis amount calculation section 110, and an edge judgment amount calculation section 111 of the half-tone image recovery section 101, (b) a group of an adjacent state detection section 105, an ordered dither type half-tone judgment section 106 of an image area judgment section 102, and (c) a multi-value converter 103.

The half-tone image recovery section 101 comprises the smoothed amount calculation section 109, the edge emphasis amount calculation section 110, the edge judgment amount calculation section 111, and a recovered data calculation section 112. The smoothed amount calculation section 109 calculates specific smoothness amount data used for recovering the half-tone image data based on respective pixel data of binary image data outputted from the matrix memory circuit 100, and then, outputs the resulting data to the recovered data calculation section 112. The edge emphasis amount calculation section 110 calculates specific emphasis data used for effecting edge emphasis process based on respective pixel data of binary image data outputted from the matrix memory circuit 100, and then, outputs the resulting data to the recovered data calculation section 112. The edge judgment amount calculation section 111 calculates a specific edge judgment amount used for judging an edge area based on respective pixel data of binary image data outputted from the matrix memory circuit 100, and then, outputs the resulting data to the recovered data calculation section 112.

The recovered data calculation section 112 recovers the multi-value half-tone image data based on the data outputted from the sections 109 through 111 as well as a Fattening type half-tone judgment signal and an ordered dither type half-tone judgment signal outputted from a judgment data signal generator 114, i.e., converts the inputted data and signals into the multi-value half-tone image data, and then, outputs the resulting data to a data mixing section 104.

The image area judgment section 102 comprises the adjacent state detection section 105, the ordered dither type half tone judgment section 106, a 9×17 matrix memory circuit 107, a judgment data generator 108, and the judgment data signal generator 114. The adjacent state detection section 105 calculates a number of adjacencies of minor pixels or smaller pixels in the main and subscan directions, representing an adjacent state of the minor pixels in four directions of the main and subscan directions belonging to the minor group of pixels located within a specified area based on respective pixel data of the binary image data outputted from the matrix memory circuit 100, and also calculates a number of black pixels located within a prescribed 7×7 pixel window. Further, the adjacent state detection section 105, based on respective data calculated as above, generates for each pixel, a non-Bayer type half-tone detection signal representing such a state that an image located within a predetermined area, in the center of which the specified pixel is located, is a non-Bayer type half-tone image, a Bayer type half-tone detection signal representing such a state that the image located within the predetermined area having the specified pixel in the center thereof is a Bayer type half-tone image, and an all white or all black image detection signal representing whether all the 7×7 pixels in the window represent white images or black images, and then, outputs the generated signals to the 9×17 matrix memory circuit 107.

Meanwhile, the ordered dither type half-tone judgment section 106 detects whether or not the image in the predetermined area having the specified pixel in the center thereof is an ordered dither type half-tone image for each pixel based on respective pixel data of the binary image data outputted from the matrix memory circuit 100, and outputs an ordered dither type half-tone judgment signal representing the detection result thereof to the 9×17 matrix memory circuit 107. Then, the 9×17 matrix memory circuit 107 simultaneously outputs to the judgment data generator 108, four detection signals of 4 bits in total for each pixel serially outputted from the adjacent state detection section 105 and the ordered dither type half-tone judgment section 106, within the 9×17 pixel window having the specified pixel in the center thereof.

Then, the judgment data generator 108 respectively generates and outputs each judgment data by summing up the above-mentioned detection signals within the 9×17 pixel window for each detection signal, based on respective detection signals output from the matrix memory circuit 107. Finally, the judgment data signal generator 114 judges whether or not the image within the predetermined 9×17 pixel window represents the Fattening type half-tone image, by means of a table ROM which stores judgment data based on respective judgment data outputted from the judgment data generator 108, and then, generates and outputs a Fattening type half-tone judgment signal representing the judgment result to the recovered data calculation section 112. The judgment data signal generator 114 also judges whether or not the image in the 9×17 pixel window represents an ordered dither type half-tone image by means of a table ROM which stores judgment data, and generates and outputs an ordered dither type half-tone judgment signal representing the judgment result to the recovered data calculation section 112. The judgment data signal generator 114 further generates image area judgment data representing a result obtained by judging whether or not the area of the pixel window is a half-tone image area or a non-half-tone image area, and outputs the resulting data to the data mixing section 104. In this case, the image area judgment data includes values ranging from 0 to 1, the value 0 of the image area judgment data representing such a case where the image in the above-mentioned window area is completely a half-tone image, and the value 1 thereof representing such a case where the image in the window area is completely a non-half-tone image.

Based on respective pixel data of the binary image data outputted from the matrix memory circuit 100, the multi-value converter 103 simply converts binary image data binarized using the non-half-tone binarizing method, into multi-value non-half-tone image data representing a white or black image, using a prescribed threshold value, and then, outputs the converted multi-value non-half-tone image data to the data mixing section 104.

The data mixing section 104 carries out a calculation of the following equation (1) based on the multi-value half-tone image data outputted from the half-tone image recovery section 101, the multi-value non-half-tone image data outputted from the multi-value converter 103, and the above-mentioned image area judgment data, thereby practically mixing the above-mentioned respective data according to a mixture ratio represented by the image area judgment data to generate and output multi-value image data to the switch section 53.

$$\text{Multi-value image data} = \quad (1)$$

$$\text{(half-tone image data)} \times \{1 - \text{(image area judgment data)}\} +$$

$$\text{(non-half-tone image data)} \times \text{(image area judgment data)}$$

In the present preferred embodiment, for the purpose of making less conspicuous the possible erroneous judgment for an area which can be recognized as a half-tone area or a non-half-tone area, the above-mentioned half-tone image data and the non-half-tone image data are mixed according to the mixture rate of the image area judgment data representing the degree of the half-tone image and the degree of the non-half-tone image, thereby recovering multi-value image data from the binary image data.

(4) Compression and expansion section

Figure 8:
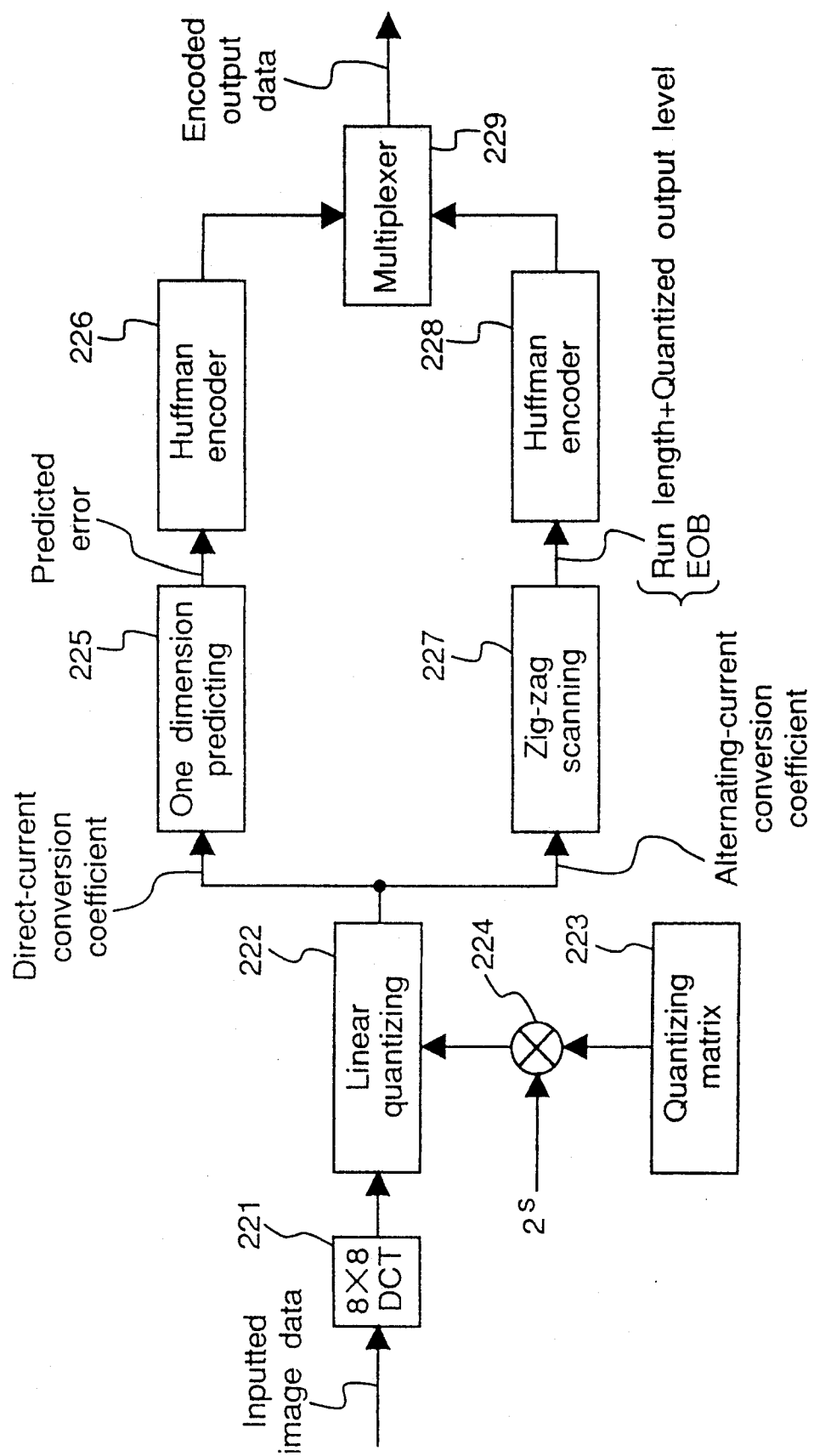
FIG. 8 is a schematic block diagram showing a compression and expansion section 58 shown in FIG. 3.

FIG. 8 shows the multi-value image data compression and expansion section 58 shown in FIG. 3. FIG. 8 shows only the compression process for the multi-value image data according to an ADCT (Adaptive Discrete Cosine Transform) system. Since the expansion process is effected by reversing the compression process, no detailed description for the expansion process is provided herein.

Referring to FIG. 8, an 8×8 DCT section 221 performs two dimensions DCT conversion on inputted multi-value image data in a unit of the subblock area within a 8×8 pixel window, and then, outputs the resulting data to a linear quantizing section 222. Sizes of quantizing step are set so as to be different from each other for respective conversion coefficients, as described below. A quantizing matrix section 223 outputs to a multiplier 224, data of elements of an 8×8 quantizing matrix which are set taking into account differences between respective conversion coefficients of visibility to quantization noise. The multiplier 224 multiplies the inputted data of the elements of the quantizing matrix by $2^s$, and then, outputs the resulting multiplication data to the linear quantizing section 222 as a size of the quantizing step for each conversion coefficient. In this case, S is referred to as a scaling factor representing 0, a positive integer or a negative integer. The scaling factor S is used for not only controlling image quality but also suppressing the amount of data to be generated. The linear quantizing section 222 linearly quantizes the inputted image data according to the size of the quantizing step inputted from the multiplier 224, generates direct-current conversion coefficient data and alternating-current conversion coefficient data, and then, outputs the former data to a one dimension predicting section 225 and outputs the latter data to a zig-zag scanning section 227.

The one dimension predicting section 225 performs one dimension prediction according to the relationships between image data of a plurality of adjacent subblock areas based on the direct-current conversion coefficient data inputted from the linear quantizing section 222, and then, outputs the resulting predicted error data to a Huffman encoder 226. The Huffman encoder 226 effects a Huffman encoding process on the inputted predicted error data, and then, outputs the resulting data to a multiplexer 229.

When the inputted image is expressed in, for example, 8 bits in this case, the predicted error ranges from −2047 to +2047. Therefore, the quantization output data of the predicted error are divided into 16 groups. Then, first of all, a discrimination number SSSS of the group to which the predicted error belongs is converted into a Huffman code, and then, which value in the group the quantization output data of the predicted error are is expressed in an isometric code having the same length.

Meanwhile, the zig-zag scanning section 227 encodes the inputted alternating-current conversion coefficient data inputted from the linear quantizing section 222, scanning them so as to changing the frequency to be scanned from a low frequency component to a high frequency component in a zig-zag manner, and then, outputs the resulting encoded code data to the multiplexer 229. In detail, inputted data of the conversion coefficient being other than zero (referred to as "a significant conversion coefficient" hereinafter) are classified into 15 groups according to the value thereof, and then, a discrimination number SSSS is given to the group thereof. A number of the conversion coefficients being other than zero (referred to as "a non-significant conversion coefficient" hereinafter) in the inputted data located between the previous significant conversion coefficient and the current conversion coefficient is defined as a run length NNNN. The Huffman encoder 228 effects the Huffman encoding on a combination of the group discrimination number SSSS and the run length NNNN, and then, expresses in the isometric code which value in the group the quantization output data of the predicted error is. When the run length NNNN has a value not smaller than 16, an R16 code is transmitted, thereby repeatedly performing an operation of subtracting 15 from the run length NNNN until the remaining value becomes not greater than 15. When all the significant conversion coefficients in all the subblock areas are completely encoded, a code of EOB (End of Block) is infallibly transmitted at last. The multiplexer 229 performs a time-division-multiplex process for the respective encoded data outputted from respective Huffman encoders 226 and 228, thereby generating and outputting resulting time-division-multiplexed data.

It is noted that the data compression and expansion section 59 shown in FIG. 3 effects compression and expansion on the inputted binary image data using the MH method or MR method, and then, outputs the resulting compressed or expanded data.

(5) MPU processing flow

Figure 9:
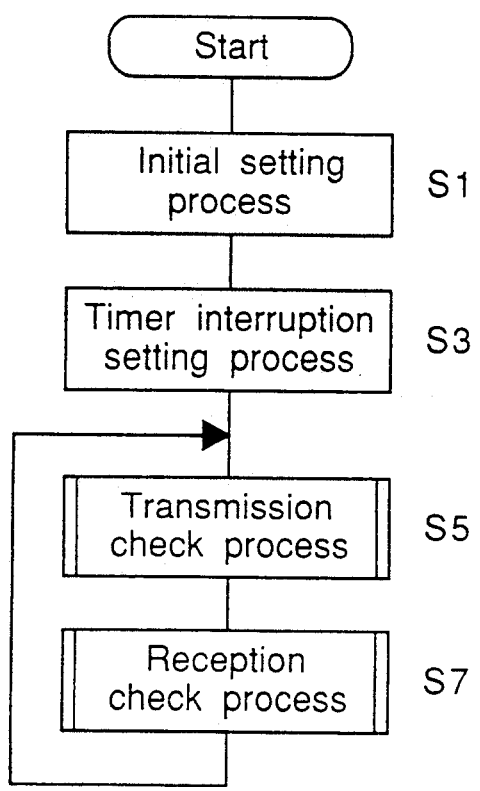
FIG. 9 is a flow chart of a main routine which is executed by an MPU 50 shown in FIG. 3.

FIG. 9 is a flow chart of a main routine executed by the MPU 50 shown in FIG. 3.

Figure 10:
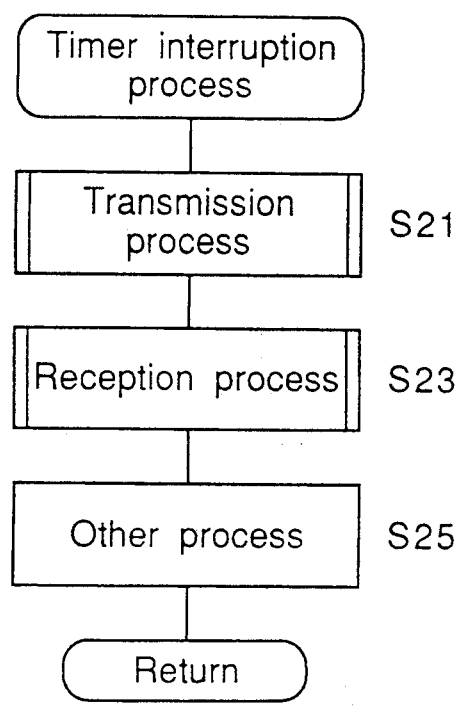
FIG. 10 is a flow chart of a timer interruption process which is executed by the MPU 50 shown in FIG. 3.

Referring to FIG. 9, an initial setting process including initialization of registers of the MPU 50, I/O ports and flags is performed at step S1, and then, a timer for timer interruption operation is set up to periodically call the timer interruption process shown in FIG. 10 at step S3. Steps S5 and S7 are check processes for making the processing steps (steps S21 and S23) in the timer interruption process shown in FIG. 10 operate in a predetermined manner. Thereafter, after executing a transmission check process at step S5 shown in FIG. 11 and a reception check process at step S7 shown in FIG. 12, the program flow returns to step S5 to repeat the same check processes.

FIG. 10 is a flow chart of the timer interruption process executed periodically by the MPU 50 shown in FIG. 3.

Figure 13:
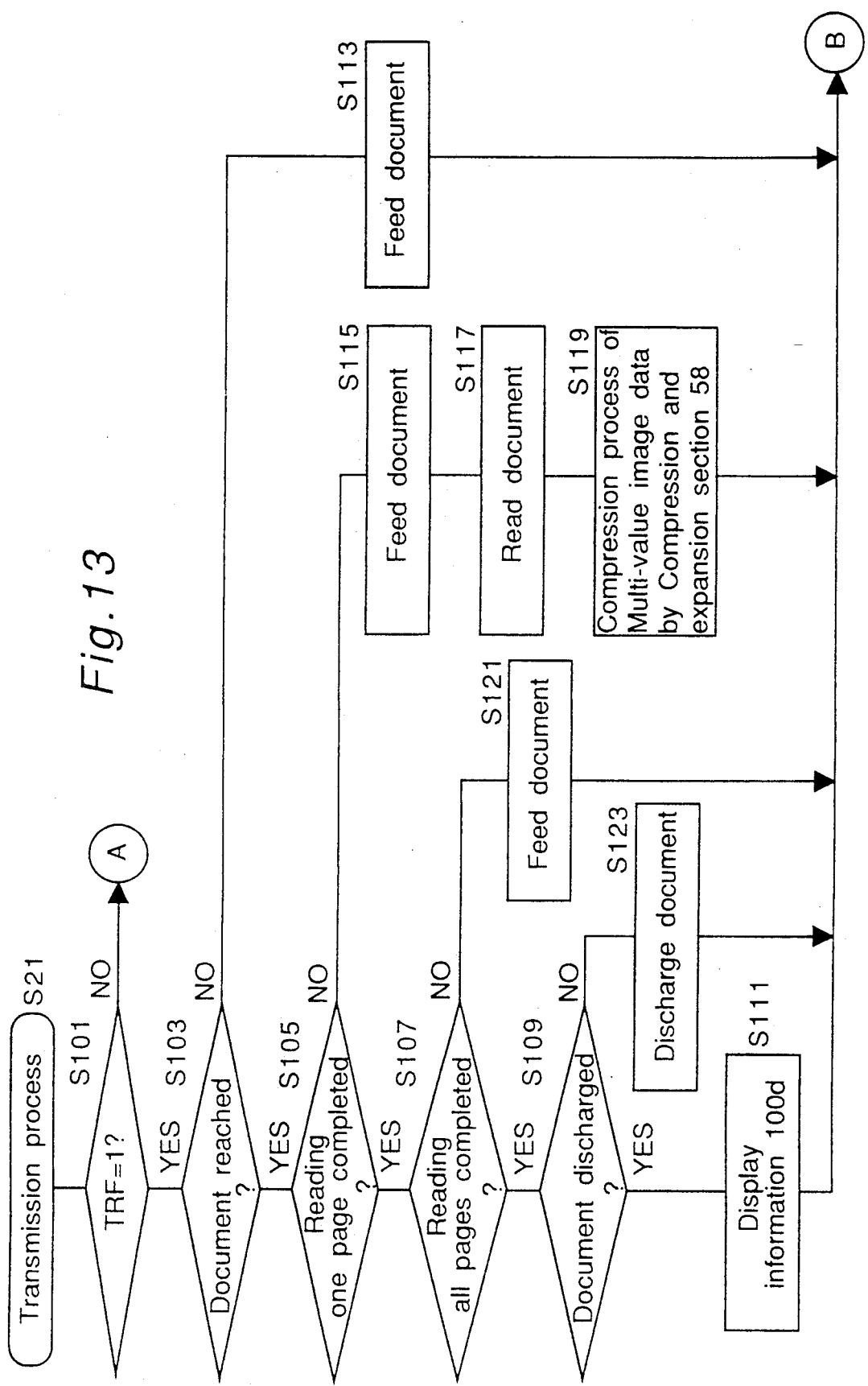
FIGS. 13 to 15 are flow charts of a transmission process of a subroutine shown in FIG. 10.
Figure 14:
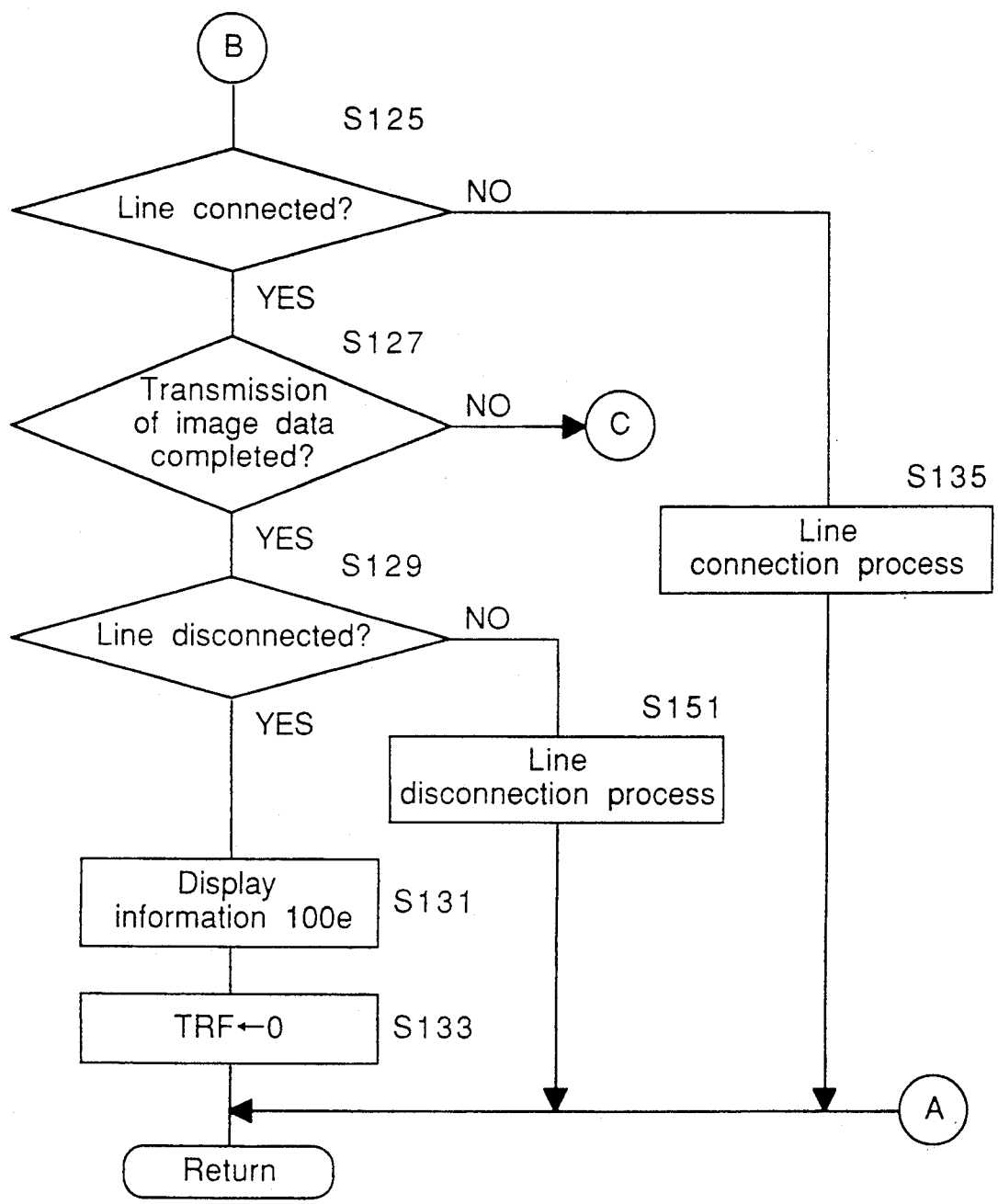
Figure 15:
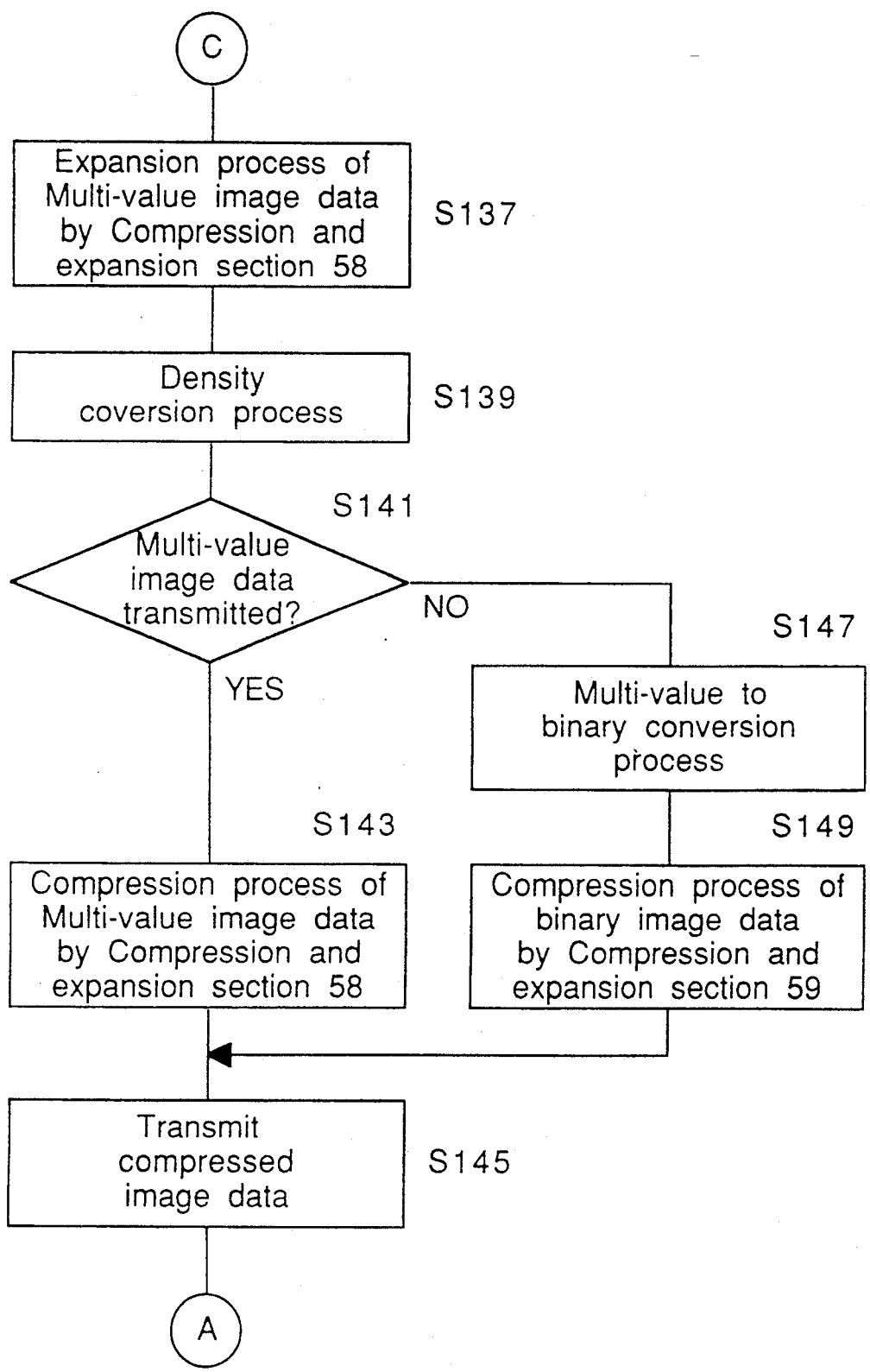

In the present timer interruption process, as shown in FIG. 10, a transmission process is executed at step S21 shown in FIGS. 13 through 15, and a reception process is executed at step S22 shown in FIGS. 16 and 17. Thereafter, processes other than the above transmission and reception processes are executed at step S25, and then, this program flow returns to the main routine.

Figure 11:
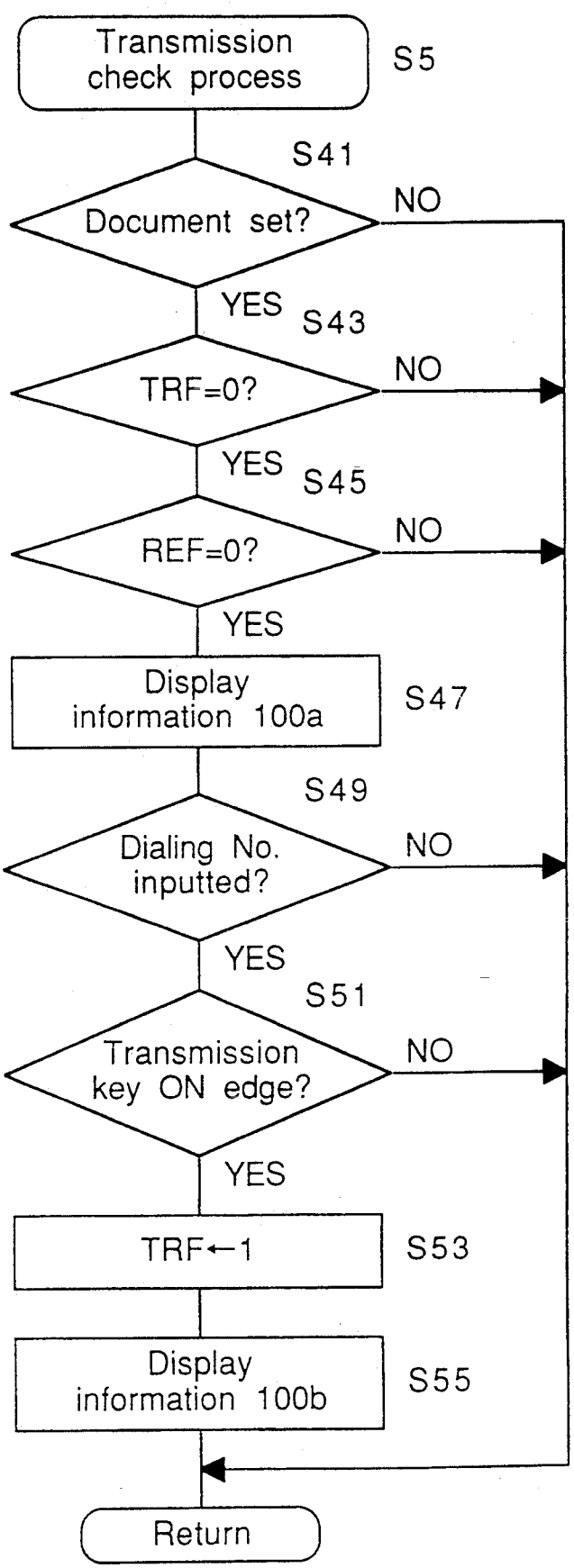
FIG. 11 is a flow chart of a transmission check process of a subroutine shown in FIG. 9.

FIG. 11 is a flow chart of the transmission check process (step S5) shown in FIG. 9.

Figure 18A:
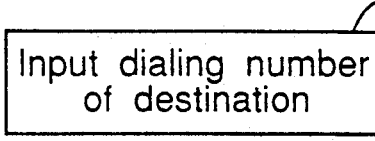
FIGS. 18a to 18g are front views showing respective display information displayed on a liquid crystal display section 42 of the operation panel 40 shown in FIG. 2.
Figure 18B:
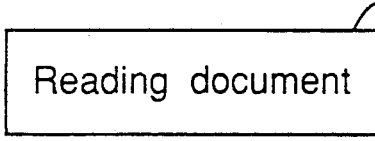

Referring to FIG. 11, it is judged whether or not a document is set on the document tray 21 at step S41. Then, it is judged whether or not a transmission flag TRF indicating that a transmission operation is currently executed is 0 at step S43, and then, it is judged whether a reception flag REF indicating that a reception operation is currently executed is 0 at step S45. When a document is set (YES at step S41), the transmission flag TRF represents 0 (YES at step S43) and the reception flag REF represents 0 (YES at step S45); the display information 100a of "Input dialing number of destination" shown in FIG. 18a is displayed on the liquid crystal display section 42 at step S47, and then, the program flow proceeds to Step S49. On the other hand, when no document is set (NO at step S41), the transmission flag REF represents 1 (NO at step S43) or the reception flag REF represents 1 (NO at step S45), the program flow directly returns to the main routine.

Then, it is judged whether or not the dialing number of the other party is inputted through a set of telephone ten keys 41 at step S49, and subsequently it is judged whether or not the transmission key 43 is on edge or turned on at step S51. When the dialing number of the other party is inputted (YES at step S49) and the transmission key 43 is on edge or turned on (YES at step S51), the transmission flag TRF for starting the transmission process (step S21) is set to 1 at step S53. Then, the display information 100b of "Reading document" is displayed on the liquid crystal display section 42 shown in FIG. 18b at step S55, and the program flow returns to the main routine. On the other hand, when the dialing number of the destination is not inputted (NO at step S49) or the transmission key 43 is not on edge or turned off (NO at step S51), the program flow directly returns to the main routine.

Figure 12:
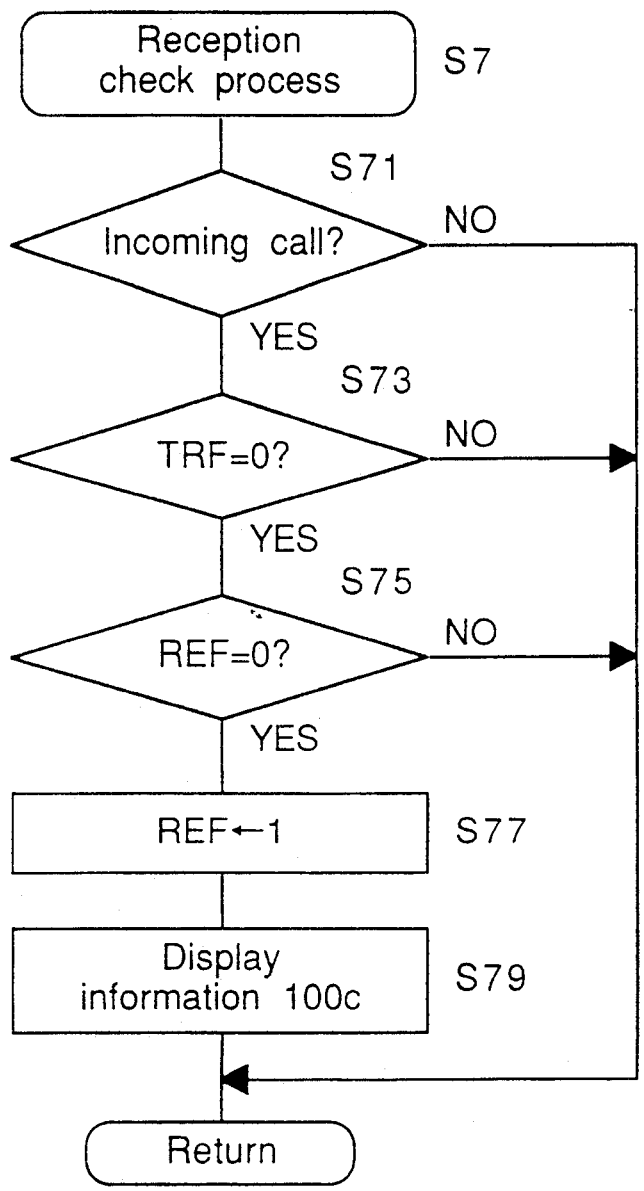
FIG. 12 is a flow chart of a reception check process of a subroutine shown in FIG. 9.

FIG. 12 is a flow chart of the reception check process (step S7) shown in FIG. 9.

Figure 18C:
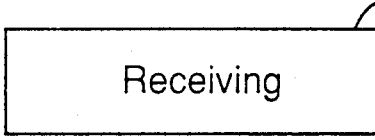

Referring to FIG. 12, it is, first of all, judged whether or not an incoming call takes place from the further facsimile apparatus of the other party at the opposite end at step S71, and then, it is judged whether or not the transmission flag TRF represents 0 at step S73. It is further judged whether or not the reception flag REF represents 0 at step S75. When an incoming call takes place (YES at step S71), the transmission flag REF represents 0 (YES at step S73) and the reception flag REF represents 0 (YES at step S75); the reception flag REF is set to 1 to start the reception process (step S23) at step S77, the display information 100c of "Receiving" shown in FIG. 18c is displayed on the liquid crystal display section 42 at step S79, and then, the program flow returns to the main routine. On the other hand, when no incoming call takes place (NO at step S71), the transmission flag TRF represents 1 (NO at step S73), or the reception flag REF represents 1 (NO at step S75); the program flow directly returns to the main routine.

FIGS. 13 through 15 are flow charts of the transmission process (step S21) shown in FIG. 10.

Referring to FIG. 13, it is judged whether or not the transmission flag TRF represents 1 at step S101. When the transmission flag TRF represents 1 (YES at step S101), the program flow proceeds to step S103. On the other hand, when the transmission flag TRF represents 0 (NO at step S101), the program flow directly returns to the main routine. After step S101, it is judged whether or not a document to be transmitted has reached the predetermined position of the image sensor 26 at step S103. When the document to be transmitted has reached the predetermined position of the image sensor 26 (YES at step S103), the program flow proceeds to step S105. On the other hand, when the document to be transmitted has not reached the predetermined position of the image sensor 26 (NO at step S103), the document is fed to the predetermined position of the image sensor 26 by means of the roller 23 at step S113, and then, the program flow proceeds to step S125 shown in FIG. 14.

Then, it is judged whether or not reading of the document image of one page has been completed by means of the image sensor 26 at step S105. When the image reading has been completed (YES at step S105), the program flow proceeds to step S107. On the other hand, when the image reading has not been completed (NO at step S105), the document is completely fed to the predetermined position of the image sensor 26 at step S115, and then, the document image is read and converted by means of the image sensor 26 at step S117, furthermore the read image data are stored into the page memory 51. Then, after effecting the compression process on the multi-value image data of the read image data by means of the data compression and expansion section 58 at step S119, the compressed image data are stored into the compressed data memory 57, and then, the program flow proceeds to step S125 as shown in FIG. 14.

Figure 18D:
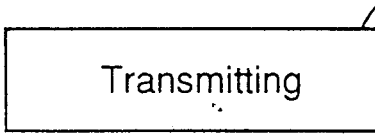
Figure 18E:
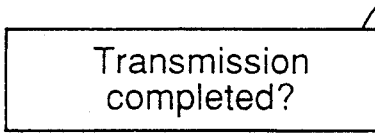
Figure 18F:
Figure 18G:
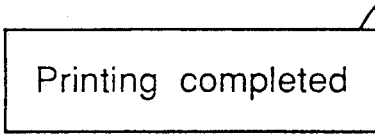

It is judged whether or not reading of the document images of all the pages has been completed at step S107. When the image reading of all the pages has been completed (YES at step S107), the program flow proceeds to step S109. On the other hand, when the image reading of all the pages has not been completed (NO at step S107), the document is fed to the predetermined position of the image sensor 26 by means of the roller 23 at step S121, and then, the program flow proceeds to step S125 shown in FIG. 14. It is further judged whether or not all the documents have been discharged at step S109. When the document discharge has been completed (YES at step S109), the display information 100d of "Transmitting" shown in FIG. 18d is displayed on the liquid crystal display section 42, and then, the program flow proceeds to step S125 shown in FIG. 14. On the other hand, when all the document discharge has not been completed (NO at step S109), all the documents are discharged at step S123, and then, the program flow proceeds to step S125 shown in FIG. 14.

Referring to FIG. 14, it is judged whether or not the present facsimile apparatus is connected to the further facsimile apparatus of the other party through the telephone line at step S125. When the line connection through the telephone line has been completed (YES at step S125), the program flow proceeds to step S127. On the other hand, when the line connection through the telephone line has not been completed (NO at step S125), the present facsimile apparatus preforms the line connection process, namely, it is connected to the further facsimile apparatus of the other party through the telephone line according to CCITT recommendation at step S135, and then, the program flow returns to the main routine. In this line connection process, the present facsimile apparatus communicates with the further facsimile apparatus of the other party by transmitting and receiving predetermined information. From the predetermined information received from the further facsimile apparatus of the other party, the present facsimile apparatus can get the performance of the further facsimile apparatus of the other party such as (a) information of a recording size in which the facsimile apparatus of the other part can record or print out an image on a piece of cut paper, (b) such information whether or not the further facsimile apparatus of the other party can receive multi-value data, or the like.

Then, it is judged whether or not transmission of the image data has been completed at step S127. When the transmission of the image data has been completed (YES at step S127), the program flow proceeds to step S129. On the other hand, when the transmission of the image data has not been completed (NO at step S127), the program flow proceeds to step S137 shown in FIG. 15.

Referring to FIG. 15, after reading out the multi-value image data stored in the compressed data memory 57 and effecting the expansion process on the read multi-value image data in the data compression and expansion section 58 at step S137, the expanded image data are stored in the page memory 51. Thereafter, the multi-value image data stored in the page memory 51 is subject to a density conversion process for processing the image data so as to automatically reduce the size of the image thereof depending on the recording size of the further facsimile apparatus of the other party at step S139, and then, the program flow proceeds to step S141.

At step S141, it is judged based on the information received in the above-mentioned line connection process of step S135 from the further facsimile apparatus of the other party, whether or not the image data are transmitted to the further facsimile apparatus of the other party in the form of multi-value image data or binary image data. When transmitting image data in the form of multi-value image data (YES at step S141), the multi-value image data outputted from the density converter 52 are temporarily stored in the page memory 51 at step S143, and then, are subjected to a prescribed compression process in the data compression and expansion section 58. Thereafter, the compressed multi-value image data are stored again into the compressed data memory 57, and then, the program flow proceeds to step S145. On the other hand, when transmitting the image data in the form of binary image data (NO at step S141), the multi-value image data outputted from the density converter 52 are inputted to the multi-value to binary converter 54 via the switch section 53, and then, are binarized through the above-mentioned multi-value to binary conversion process at step S147. Thereafter, the resulting data after the multi-value to binary conversion process are stored into the page memory 56. Then, after reading the binary image data stored in the page memory 56 and effecting the prescribed data compression on the image data in the data compression and expansion section 59 at step S149, the compressed image data are stored again into the compressed data memory 57, and then, the program flow proceeds to step S145.

It is noted that the process steps of S137 through steps S139 and S141 to step S143 and the expansion and re-compression process steps of S137 through steps S139, S141 and S147 to step S149 are repeatedly carried out in a unit of a plurality of scanning lines in the main scan direction, for example, 16 lines. Further at step S145, the re-compressed image data obtained as described above are read out from the compressed data memory 57, and then, are inputted into the HDLC analyzer 60. Thereafter the image data are processed and converted into data in a prescribed HDLC form by the HDLC analyzer 60, and then, the processed data in the HDLC form are inputted to the MODEM 61. A carrier signal is modulated by the MODEM 61 according to the processed data so as to generate a facsimile signal in a predetermined form, and then, the generated facsimile signal is transmitted through the NCU 62, the telephone line and a public telephone network to the further facsimile apparatus of the other party, and then, the program flow returns to the main routine.

Referring back to FIG. 14, it is judged whether or not the line disconnection process between the present facsimile apparatus and the further facsimile apparatus of the other party has been completed at step S129. When the line disconnection process has been completed (YES at step S129), the display information 100e of "Transmission completed?" is displayed on the liquid crystal display section 42 at step S131. Thereafter, the transmission flag TRF is reset to 0 at step S133, and then, the program flow returns to the main routine. On the other hand, the line disconnection process from the further facsimile apparatus of the other party has not been completed (NO at step S129), the line disconnection process is executed at step S151, and then, the program flow returns to the main routine.

FIGS. 16 and 17 are flow charts of the reception process (step S22) shown in FIG. 10.

Referring to FIG. 16, first of all, it is judged whether or not the reception flag REF represents 1 at step S201. When the reception flag REF represents 1 (YES at step S201), the program flow proceeds to step S203. On the other hand, when the reception flag REF represents 0 (NO at step S201), the program flow directly returns to the main routine. After step S201, the program flow proceeds to step S203, and then, it is judged whether or not line connection process between the present facsimile apparatus and the further facsimile apparatus of the other party has been completed. When the line connection process has been completed (YES at step S203), the program flow proceeds to step S205. On the other hand, when the line connection process has not been completed (NO at step S203), the present facsimile apparatus is connected through the telephone line to the further facsimile apparatus of the other party at step S211, and then, the program flow proceeds to step S217 shown in FIG. 17.

Further, it is judged at step S205 whether or not reception of all the image data of the facsimile signal transmitted from the further facsimile apparatus of the other party has been completed at step S205. When the reception of the data has been completed (YES at step S205), the program flow proceeds to step S207. On the other hand, when reception of the data has not been completed (NO at step S205), the compressed image data of the facsimile signal transmitted from the further facsimile apparatus of the other party are received at step S213. In more detail, the data signal from the further facsimile apparatus of the other party is inputted via the telephone line and the NCU 62 to the MODEM 61, and is demodulated so as to generate image data. The generated image data are subject to a prescribed HDLC counter process in the HDLC analyzer 60, and then, the processed data are stored into the compressed data memory 57. Thereafter, the program flow proceeds to step S217 shown in FIG. 17.

Then, it is judged whether or not the line disconnection process has been completed at step S207. When the line disconnection process has been completed (YES at step S207), the display information 100f of "Printing" is displayed on the liquid crystal display section 42 at step S209, and then, the program flow proceeds to step S217 shown in FIG. 17. On the other hand, when the line disconnection process has not been completed (NO at step S207), the line disconnection process from the further facsimile apparatus of the other party is executed at step S215, and then, the program flow proceeds to step S217 shown in FIG. 17.

Further, referring to FIG. 17, it is judged whether or not printing of image data of one page has been completed in the printer 1 at step S217. When the printing has been completed (YES at step S217), the program flow proceeds to step S219. On the other hand, when the printing has not been completed (NO at step S217), the program flow proceeds to step S225.

It is judged at step S225 whether or not expansion of image data of one page has been completed, and then, it is judged at step S229 whether or not multi-value image data has been received, based on a received discrimination signal representing transmission of multi-value image data transmission or binary image data which is included, for example, in a non standard function setting signal (NSS) according to the CCITT recommendation transmitted from the further facsimile apparatus of the other party in a training interval. When the expansion has not been completed (NO at step S225) and multi-value image data are received (YES at step S229), the compressed multi-value image data stored in the compressed data memory 57 are read out therefrom and are expanded in the data compression and expansion section 58, and then, the expanded image data are stored into the page memory 51. Thereafter, the program flow returns to the main routine. On the other hand, when the expansion has not been completed (NO at step S225) and binary image data are received (NO at step S229), the binary image data stored in the compressed data memory 57 are read therefrom and are expanded in the data compression and expansion section 59, and then, the expanded image data are stored into the page memory 56. Thereafter, at step S235, the binary image data are read from the page memory 56, and are inputted into the binary to multi-value converter 55, then, they are converted into multi-value image data through the aforementioned binary to multi-value conversion. The resulting multi-value data are transferred via the density converter 52 for effecting the above-mentioned density conversion with substantially the equal magnification ratio onto the page memory 51, and then, are stored into the page memory 51 in a developed form. Thereafter, program flow returns to the main routine.

When the expansion of image data of one page has been completed (YES at step S225), image data are read out from the page memory 51 at step S227 and are inputted to the printer 1 to print the image of the image data of one page in multi-gradation stages, and then, the program flow returns to the main routine.

In the case of YES at step S217, it is further judged whether or not printing of the images of image data of all the pages has been completed at step S219. When the printing has been completed (YES at step S219), the display information 100g of "Printing completed?" is displayed on the liquid crystal display section 42 at step S221. Then, the reception flag REF is reset to zero at step S223, and then, the program flow returns to the main routine. On the other hand, when the printing has not been completed (NO at step S219), the program flow returns to the main routine.

(6) Other preferred embodiments

Although the above-mentioned preferred embodiment describes process of black and white image data, the scope of the present invention is not limited to the preferred embodiment. By providing a necessary number of page memories which is the same number as that of colors of image data to be processed, image data of a color image may be processed.

Although the above-mentioned preferred embodiment discriminates whether the received image data are multi-value image data or binary image data based on the above-mentioned discrimination signal transmitted from the further facsimile apparatus of the other party, the scope of the present invention is not limited to the preferred embodiment. The above-mentioned discrimination may be performed, for example, by judging whether or not the data amount of one page exceeds a prescribed threshold value.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A facsimile apparatus comprising:
image data receiving means for receiving compressed image data transmitted from a transmission apparatus apart from said facsimile apparatus;
first expanding means for expanding said compressed image data received by said image data receiving means using a first expanding method;
second expanding means for expanding said compressed image data received by said image data receiving means using a second expanding method different from said first expanding method;
converting means for converting binary image data representing an image density of each pixel in binary representation of black pixel or white pixel, into multi-value image data representing an image density of each pixel in multi-gradation stages representation including half-tone density;
printing means for printing an image corresponding to multi-value image data in multi-gradation stages;
judging means for judging whether said image data received by said image data receiving means are binary image data or multi-value image data; and
controlling means for controlling said first expanding means and said printing means to expand said compressed image data judged as multi-value image data by said judging means and thereafter print an image corresponding to said expanded image data, and for controlling said second expanding means, said converting means and said printing means to expand said compressed image data judged as binary image data by said judging means, convert said expanded image data into multi-value image data, and thereafter print an image corresponding to said converted multi-value image data.

2. The apparatus as claimed in claim 1,
wherein said judging means judges whether said image data received by said image data receiving means are binary image data or multi-value image data, based on said image data received by said image data receiving means.

3. The apparatus as claimed in claim 1,
wherein said judging means judges whether said image data received by said image data receiving means are binary image data or multi-value image data, based on a data amount of said image data received by said image data receiving means.

4. The apparatus as claimed in claim 1,
wherein said judging means judges whether said image data received by said image data receiving means are binary image data or multi-value image data by checking whether or not a data amount of said image data of one page received by said image data receiving means is larger than a predetermined threshold value.

5. The apparatus as claimed in claim 1, further comprising discrimination signal receiving means for receiving a discrimination signal transmitted from said transmission apparatus,
wherein said judging means judges whether said image data received by said image data receiving means are binary image data or multi-value image data based on said discrimination signal received by said discrimination signal receiving means.

6. A facsimile apparatus comprising:
image data receiving means for receiving compressed image data transmitted from a transmission apparatus apart from said facsimile apparatus;
first storage means for storing therein said compressed image data received by said image data receiving means;
judging means for judging whether said image data received by said image data receiving means are binary image data representing an image density of each pixel in binary representation of black pixel or white pixel or multi-value image data representing an image density of each pixel in multi-gradation stages representation including half-tone density;
first expanding means for reading out said compressed image data stored in said first storage means and expanding said read compressed image data using a first expanding method when said judging means judges that said image data received by said image data receiving means are binary image data;

second expanding means for reading out said compressed image data stored in said first storage means and expanding said read compressed image data using a second expanding method different from said first expanding method when said judging means judges that said image data received by said image data receiving means are multi-value image data;

converting means for converting said binary image data expanded by said first expanding means into multi-value image data; and printing means for printing in multi-gradation stages an image corresponding to said multi-value image data converted by said converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

7. The apparatus as claimed in claim 6, further comprising second storage means for storing therein said multi-value image data converted by said converting means when said judging means judges that said image data received by said image data receiving means are binary image data, and for storing therein said image data expanded by said second expanding means when said judging means judges that said image data received by said image data receiving means are multi-value image data, wherein said printing means prints an image corresponding to said image data stored in said second storage means.

8. The apparatus as claimed in claim 7, further comprising third storage means for storing therein said image data expanded by said first expanding means, wherein said converting means for converting said image data stored in said third storage means into multi-value image data.

9. The facsimile apparatus as claimed in claim 6, wherein said judging means judges whether said image data received by said image data receiving means are binary image data or multi-value image data, based on said image data received by said image data receiving means.

10. The facsimile apparatus as claimed in claim 6, wherein said judging means judges whether said image data received by said image data receiving means are binary image data or multi-value image data, based on a data amount of said image data received by said image data receiving means.

11. The facsimile apparatus as claimed in claim 6, wherein said judging means judges whether said image data received by said image data receiving means are binary image data or multi-value image data by checking whether or not a data amount of said image data of one page received by said image data receiving means is larger than a predetermined threshold value.

12. The facsimile apparatus as claimed in claim 6, further comprising discrimination signal receiving means for receiving a discrimination signal transmitted from said transmission apparatus, wherein said judging means judges whether said image data received by said image data receiving means are binary image data or multi-value image data based on said discrimination signal received by said discrimination signal receiving means.

13. A facsimile apparatus comprising:
image data receiving means for receiving compressed image data transmitted from a transmission apparatus apart from said facsimile apparatus;

judging means for judging whether said image data received by said image data receiving means are binary image data representing an image density of each pixel in binary representation of black pixel or white pixel, or multi-value image data representing an image density of each pixel in multi-gradation stages representation including half-tone density;

recovering means for processing in a predetermined process said compressed image data received by said image data receiving means, said recovering means including:

expanding means for expanding said compressed image data to be processed using a first expanding method when said judging means judges that said image data received by said image data receiving means are binary image data, and for expanding said compressed image data to be processed using a second expanding method different from said first expanding method when said judging means judges that said image data received by said image data receiving means are multi-value image data, and converting means for converting said image data expanded by said expanding means into multi-value image data when said judging means judges that said image data received by said image data receiving means are binary image data; and printing means for printing in multi-gradation stages an image corresponding to said image data processed by said recovering means.

14. A facsimile apparatus comprising:
image reading means for reading a document image and converting said read document image into multi-value image data representing an image density of each pixel in multi-gradation stages representation including half-tone density;

determining means for determining whether said multi-value image data converted by said image reading means are to be transmitted in a form of multi-value image data or are to be transmitted in another form of binary image data representing an image density of each pixel in binary representation of black pixel or white pixel;

first converting means for converting said multi-value image data converted by said image reading means into binary image data when said determining means determines that said multi-value image data converted by said image reading means are to be transmitted in the form of binary image data;

first compressing means for compressing said binary image data converted by said first converting means using a first compressing method;

second compressing means for compressing said multi-value image data converted by said image reading means using a second compressing method different from said first compressing method;

image data transmitting means for transmitting to a further facsimile apparatus apart from said facsimile apparatus said image data compressed by said first compressing means when said determining means determines that said multi-value image data converted by said image reading means are to be transmitted in the form of binary image data, and for transmitting to said further facsimile apparatus said image data compressed by said second compressing means when said determining means determines that said multi-value image data converted by said image reading means are to be transmitted in the form of multi-value image data;

image data receiving means for receiving compressed image data transmitted from said further facsimile apparatus;

judging means for judging whether said image data received by said image data receiving means are binary image data or multi-value image data;

first expanding means for expanding said compressed image data received by said image data receiving means using a first expanding method when said judging means judges that said image data received by said image data receiving means are binary image data;

second expanding means for expanding said compressed image data received by said image data receiving means using a second expanding method different from said first expanding method when said judging means judges that said image data received by said image data receiving means are multi-value image data;

second converting means for converting said binary image data expanded by said first expanding means into multi-value image data; and printing means for printing in multi-gradation stages an image corresponding to said multi-value image data converted by said second converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

15. The facsimile apparatus as claimed in claim 14, wherein said judging means judges whether said image data received by said image data receiving means are binary image data or multi-value image data, based on said image data received by said image data receiving means.

16. The facsimile apparatus as claimed in claim 14, wherein said judging means judges whether said image data received by said image data receiving means are binary image data or multi-value image data, based on a data amount of said image data received by said image data receiving means.

17. The facsimile apparatus as claimed in claim 14, wherein said judging means judges whether said image data received by said image data receiving means are binary image data or multi-value image data by checking whether or not a data amount of said image data of one page received by said image data receiving means is larger than a predetermined threshold value.

18. The facsimile apparatus as claimed in claim 14, further comprising:

discrimination signal transmitting means for transmitting a predetermined discrimination signal corresponding to the determination result of said determining means to said further facsimile apparatus; and discrimination signal receiving means for receiving said discrimination signal transmitted from said further facsimile apparatus, wherein said judging means judges whether said image data received by said image data receiving means are binary image data or multi-value image data based on said discrimination signal received by said discrimination signal receiving means.

19. The apparatus as claimed in claim 14, wherein said determining means determines whether said multi-value image data are to be transmitted in the form of multi-value image data or are to be transmitted in another form of binary image data, based on information representing a performance of said further facsimile apparatus transmitted from said further facsimile apparatus.

20. A facsimile apparatus comprising:

image reading means for reading a document image and converting said read document image into multi-value image data representing an image density of each pixel in multi-gradation stages representation including half-tone density;

storage means for compressing said image data converted by said image reading means and storing said compressed image data therein;

determining means for determining whether said multi-value image data converted by said image reading means are to be transmitted in a form of multi-value image data or are to be transmitted in another form of binary image data representing an image density of each pixel in binary representation of black pixel or white pixel;

first converting means for converting said multi-value image data converted by said image reading means into binary image data when said determining means determines that said multi-value image data converted by said image reading means are to be transmitted in the form of binary image data;

first compressing means for compressing said binary image data converted by said first converting means using a first compressing method;

second compressing means for reading out said image data stored in said storage means, expanding said read image data to generate multi-value image data, and compressing said generated multi-value image data using a second compressing method different from said first compressing method;

image data transmitting means for transmitting to a further facsimile apparatus apart from said facsimile apparatus said image data compressed by said first compressing means when said determining means determines that said multi-value image data converted by said image reading means are to be transmitted in the form of binary image data, and for transmitting to said further facsimile apparatus said image data compressed by said second compressing means when said determining means determines that said multi-value image data converted by said image reading means are to be transmitted in the form of multi-value image data;

image data receiving means for receiving compressed image data transmitted from said further facsimile apparatus;

judging means for judging whether said image data received by said image data receiving means are binary image data or multi-value image data;

first expanding means for expanding said compressed image data received by said image data receiving means using a first expanding method when said judging means judges that said image data received by said image data receiving means are binary image data;

second expanding means for expanding said compressed image data received by said image data receiving means using a second expanding method different from said first expanding method when said judging means judges that said image data received by said image data receiving means are multi-value image data;

second converting means for converting said binary image data expanded by said first expanding means into multi-value image data; and printing means for printing in multi-gradation stages an image corresponding to said multi-value image data converted by said second converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

21. The facsimile apparatus as claimed in claim 20, wherein said judging means judges whether said image data received by said image data receiving means are binary image data or multi-value image data, based on said image data received by said image data receiving means.

22. The facsimile apparatus as claimed in claim 20, wherein said judging means judges whether said image data received by said image data receiving means are binary image data or multi-value image data, based on a data amount of said image data received by said image data receiving means.

23. The facsimile apparatus as claimed in claim 20, wherein said judging means judges whether said image data received by said image data receiving means are binary image data or multi-value image data by checking whether or not a data amount of said image data of one page received by said image data receiving means is larger than a predetermined threshold value.

24. The facsimile apparatus as claimed in claim 20, further comprising:

discrimination signal transmitting means for transmitting a predetermined discrimination signal corresponding to the determination result of said determining means to said further facsimile apparatus; and discrimination signal receiving means for receiving said discrimination signal transmitted from said further facsimile apparatus, wherein said judging means judges whether said image data received by said image data receiving means are binary image data or multi-value image data based on said discrimination signal received by said discrimination signal receiving means.

25. The apparatus as claimed in claim 20, wherein said determining means determines whether said multi-value image data are to be transmitted in the form of multi-value image data or are to be transmitted in another form of binary image data, based on information representing a performance of said further facsimile apparatus transmitted from said further facsimile apparatus.

26. A facsimile apparatus comprising:

image reading means for reading a document image and converting said read document image into multi-value image data representing an image density of each pixel in multi-gradation stages representation including half-tone density;

storage means for compressing said image data converted by said image reading means and storing said compressed image data therein;

reducing means for reading out said image data stored in said storage means, expanding said read image data to generate multi-value image data, and processing said generated multi-value image data so as to reduce a size of an image of said generated multi-value image data;

determining means for determining whether said multi-value image data converted by said image reading means are to be transmitted in a form of multi-value image data, or are to be transmitted in another form of binary image data representing an image density of each pixel in binary representation of black pixel or white pixel;

first converting means for converting said multi-value image data processed by said reducing means into binary image data when said determining means determines that said multi-value image data converted by said image reading means are to be transmitted in the form of binary image data;

first compressing means for compressing said binary image data converted by said first converting means using a first compressing method;

second compressing means for compressing said multi-value image data processed by said reducing means using a second compressing method different from said first compressing method;

image data transmitting means for transmitting to a further facsimile apparatus apart from said facsimile apparatus said image data compressed by said first compressing means when said determining means determines that said multi-value image data converted by said image reading means are to be transmitted in the form of binary image data, and for transmitting to said further facsimile apparatus said image data compressed by said second compressing means when said determining means determines that said multi-value image data converted by said image reading means are to be transmitted in the form of multi-value image data;

image data receiving means for receiving compressed image data transmitted from said further facsimile apparatus;

judging means for judging whether said image data received by said image data receiving means are binary image data or multi-value image data;

first expanding means for expanding said compressed image data received by said image data receiving means using a first expanding method when said judging means judges that said image data received by said image data receiving means are binary image data;

second expanding means for expanding said compressed image data received by said image data receiving means using a second expanding method different from said first expanding method when said judging means judges that said image data received by said image data receiving means are multi-value image data;

second converting means for converting said binary image data expanded by said first expanding means into multi-value image data; and printing means for printing in multi-gradation stages an image corresponding to said multi-value image data converted by said second converting means when said judging means judges that said image data received by said image data receiving means are binary image data, and for printing in multi-gradation stages an image corresponding to said image data expanded by said second expanding means when said judging means judges that said image data received by said image data receiving means are multi-value image data.

27. The facsimile apparatus as claimed in claim 26, wherein said judging means judges whether said image data received by said image data receiving means are binary image data or multi-value image data, based on said image data received by said image data receiving means.

28. The facsimile apparatus as claimed in claim 26, wherein said judging means judges whether said image data received by said image data receiving means are binary image data or multi-value image data, based on a data amount of said image data received by said image data receiving means.

29. The facsimile apparatus as claimed in claim 26, wherein said judging means judges whether said image data received by said image data receiving means are binary image data or multi-value image data by checking whether or not a data amount of said image data of one page received by said image data receiving means is larger than a predetermined threshold value.

30. The facsimile apparatus as claimed in claim 26, further comprising:

discrimination signal transmitting means for transmitting a predetermined discrimination signal corresponding to the determination result of said determining means to said further facsimile apparatus; and discrimination signal receiving means for receiving said discrimination signal transmitted from said further facsimile apparatus, wherein said judging means judges whether said image data received by said image data receiving means are binary image data or multi-value image data based on said discrimination signal received by said discrimination signal receiving means.

31. The apparatus as claimed in claim 26, wherein said determining means determines whether said multi-value image data are to be transmitted in the form of multi-value image data or are to be transmitted in another form of binary image data, based on information representing a performance of said further facsimile apparatus transmitted from said further facsimile apparatus.

* * * * *